United States Patent
Ito et al.

(10) Patent No.: US 11,414,515 B2
(45) Date of Patent: *Aug. 16, 2022

(54) POLYMERIZABLE COMPOSITION FOR OPTICAL MATERIAL AND OPTICAL MATERIAL AND PLASTIC LENS OBTAINABLE FROM SAME COMPOSITION

(71) Applicant: MITSUI CHEMICALS, INC., Tokyo (JP)

(72) Inventors: Shinsuke Ito, Omuta (JP); Koji Suesugi, Arao (JP); Masayuki Furuya, Arao (JP); Takeshi Nishimura, Yanagawa (JP); Mamoru Tanaka, Fukuoka (JP)

(73) Assignee: MITSUI CHEMICALS, INC., Tokyo (JP)

(*) Notice: Subject to any disclaimer, the term of this patent is extended or adjusted under 35 U.S.C. 154(b) by 218 days.

This patent is subject to a terminal disclaimer.

(21) Appl. No.: 16/086,917

(22) PCT Filed: Mar. 29, 2017

(86) PCT No.: PCT/JP2017/012876
§ 371 (c)(1),
(2) Date: Sep. 20, 2018

(87) PCT Pub. No.: WO2017/170680
PCT Pub. Date: Oct. 5, 2017

(65) Prior Publication Data
US 2019/0100614 A1 Apr. 4, 2019

(30) Foreign Application Priority Data
Mar. 30, 2016 (JP) .............. JP2016-067673

(51) Int. Cl.
| | | |
|---|---|---|
| C08G 18/75 | (2006.01) | |
| C08K 5/06 | (2006.01) | |
| G02B 1/04 | (2006.01) | |
| B29D 11/00 | (2006.01) | |
| C08K 5/10 | (2006.01) | |
| C08G 18/67 | (2006.01) | |
| C08L 101/00 | (2006.01) | |
| B29C 39/02 | (2006.01) | |
| C08K 5/053 | (2006.01) | |
| B29C 39/00 | (2006.01) | |
| C08F 18/00 | (2006.01) | |
| C08F 20/20 | (2006.01) | |
| C08F 20/56 | (2006.01) | |
| C08F 38/02 | (2006.01) | |
| C08G 18/32 | (2006.01) | |
| C08G 18/38 | (2006.01) | |
| C08G 18/73 | (2006.01) | |
| C08G 59/30 | (2006.01) | |
| C08G 75/02 | (2016.01) | |
| C08L 71/02 | (2006.01) | |
| B29L 11/00 | (2006.01) | |

(52) U.S. Cl.
CPC .......... *C08G 18/758* (2013.01); *B29C 39/006* (2013.01); *B29C 39/02* (2013.01); *C08F 18/00* (2013.01); *C08F 20/20* (2013.01); *C08F 20/56* (2013.01); *C08F 38/02* (2013.01); *C08G 18/3203* (2013.01); *C08G 18/3876* (2013.01); *C08G 18/67* (2013.01); *C08G 18/73* (2013.01); *C08G 59/302* (2013.01); *C08G 75/02* (2013.01); *C08K 5/053* (2013.01); *C08K 5/06* (2013.01); *C08K 5/10* (2013.01); *C08L 71/02* (2013.01); *C08L 101/00* (2013.01); *G02B 1/04* (2013.01); *B29L 2011/0016* (2013.01)

(58) Field of Classification Search
CPC .. C08G 18/758; C08G 18/67; C08G 18/3203; C08G 18/73; C08G 59/302; C08G 75/02; C08K 5/06; C08K 5/10; C08K 5/053; B29C 39/02; B29C 39/006; B29D 11/00; G02B 1/04; C08F 18/00; C08F 20/20; C08F 20/56; C08F 38/02
See application file for complete search history.

(56) References Cited

U.S. PATENT DOCUMENTS

| | | | |
|---|---|---|---|
| 9,505,872 B2 | 11/2016 | Ryu et al. | |
| 2004/0059013 A1* | 3/2004 | Tanabe ................ | C08G 18/672 522/90 |
| 2009/0186207 A1* | 7/2009 | Hayata ................. | C08L 69/00 428/220 |
| 2013/0059068 A1 | 3/2013 | Yajima | |
| 2013/0242393 A1* | 9/2013 | Ryu .................... | G02B 5/3033 359/488.01 |
| 2016/0122533 A1* | 5/2016 | Tomita ................ | G02B 1/045 428/220 |
| 2016/0237198 A1 | 8/2016 | Tsukada et al. | |

(Continued)

FOREIGN PATENT DOCUMENTS

| | | |
|---|---|---|
| CN | 1461417 A | 12/2003 |
| CN | 103483521 A | 1/2014 |

(Continued)

OTHER PUBLICATIONS

International Search Report (PCT/ISA/210) dated Jun. 6, 2017, by the Japanese Patent Office as the International Searching Authority for International Application No. PCT/JP2017/012876.

(Continued)

*Primary Examiner* — Mathieu D Vargot
(74) *Attorney, Agent, or Firm* — Buchanan, Ingersoll & Rooney PC

(57) ABSTRACT

A polymerizable composition for an optical material according to the present invention includes one or two or more compounds selected from the group consisting of component (A): an ester compound having a specific structure and component (B): an ether compound having a specific structure, and a polymerizable compound.

8 Claims, No Drawings

(56) References Cited

U.S. PATENT DOCUMENTS

| | | | |
|---|---|---|---|
| 2016/0282515 A1 | 9/2016 | Tsukada et al. | |
| 2017/0044299 A1 | 2/2017 | Ryu et al. | |
| 2018/0022860 A1* | 1/2018 | Ito | C08G 18/4009 528/18 |

FOREIGN PATENT DOCUMENTS

| | | |
|---|---|---|
| EP | 1331494 A1 | 7/2003 |
| EP | 1331494 A4 | 1/2005 |
| EP | 3308928 A1 | 4/2018 |
| JP | 2005228888 A | 8/2005 |
| JP | 2006224484 A | 8/2006 |
| JP | 2007090574 A | 4/2007 |
| JP | 2007261054 A | 10/2007 |
| JP | 4069364 B2 * | 4/2008 |
| JP | 2009226742 A | 10/2009 |
| JP | 2011207152 A | 10/2011 |
| JP | 2012118326 A | 6/2012 |
| JP | 2013011874 A | 1/2013 |
| JP | 2014141033 A | 8/2014 |
| JP | 2015199939 A | 11/2015 |
| WO | 0233447 A1 | 4/2002 |
| WO | 2015060260 A1 | 4/2015 |
| WO | 2016204111 A1 | 12/2016 |

OTHER PUBLICATIONS

Written Opinion (PCT/ISA/237) dated Jun. 6, 2017, by the Japanese Patent Office as the International Searching Authority for International Application No. PCT/JP2017/012876.

Office Action dated Jul. 27, 2020, by the State Intellectual Property of the People's Republic of China in corresponding Chinese Patent Application No. 201780018297.6. (7 pages).

* cited by examiner

POLYMERIZABLE COMPOSITION FOR OPTICAL MATERIAL AND OPTICAL MATERIAL AND PLASTIC LENS OBTAINABLE FROM SAME COMPOSITION

TECHNICAL FIELD

The present invention relates to a polymerizable composition for an optical material, and an optical material and plastic lens obtainable from the same composition.

BACKGROUND ART

One particularly difficult challenge to solve when manufacturing an optical material by thermally curing a polymerizable composition which includes a polymerization reactive compound (also described below as "polymerizable compound" or "monomer") is striae. Striae are marks generated during a cast polymerization of monomers, or flowing marks which are cured by convection due to an influence of heat generation of monomers during polymerization, temperature difference with the surroundings, or the like. Especially, striae are very likely to occur in items with thick shapes.

As a method of suppressing striae, curing may be carried out slowly over a long period of time such that the monomer does not flow, or underwater polymerization or the like may be performed to increase the heat conduction.

According to the apparatus for manufacturing a plastic lens described in Patent Document 1, it is described as being possible to provide an apparatus for manufacturing plastic lenses which is compact and has excellent space efficiency and which is able to manufacture a plastic lens during one revolution of a mold injected with a plastic composition placed on a rotary table.

In addition, for example, there are a method in which a monomer composition is thickened to a specific range by a preliminary reaction, and then polymerized and cured by a heating polymerization program similar to a conventional manufacturing method (Patent Document 2), a method in which, in the middle of a step of polymerizing and curing a monomer composition, a molded article filled with the monomer composition is forcibly moved regularly or irregularly so as to eliminate unevenness of the monomer during curing and to suppress a generation of optical distortion or striae (Patent Document 3), a method of optimizing a temperature program when polymerizing a monomer composition (Patent Document 4), a method of holding and curing a molded article filled with a monomer composition at a specific angle from the horizontal plane when polymerizing and curing a monomer composition (Patent Document 5), a method of polymerizing by irradiation with microwaves in a state where a mold filled with a monomer composition is immersed in a liquid (Patent Document 6), and the like.

In addition, as a composition for an optical material including a fatty acid ester-based compound, there are the techniques described in Patent Documents 7 and 8.

RELATED DOCUMENT

Patent Document

[Patent Document 1] Japanese Laid-open Patent Publication No. 2006-224484
[Patent Document 2] Japanese Laid-open Patent Publication No. 2007-90574
[Patent Document 3] Japanese Laid-open Patent Publication No. 2007-261054 [Patent Document 4] Japanese Laid-open Patent Publication No. 2009-226742
[Patent Document 5] Japanese Laid-open Patent Publication No. 2011-207152
[Patent Document 6] Japanese Laid-open Patent Publication No. 2014-141033
[Patent Document 7] Japanese Laid-open Patent Publication No. 2012-118326
[Patent Document 8] Japanese Laid-open Patent Publication No. 2015-199939

SUMMARY OF THE INVENTION

Technical Problem

Using the related art methods described in patent documents 1 to 6 makes it possible to obtain a molded article in which the generation of striae is suppressed to a certain extent, and to produce a plastic lens in which striae are suppressed using the molded article as a base material.

However, even if curing is carried out over time to suppress striae, there are many monomer compositions with which it is difficult to suppress striae sufficiently. With such a monomer composition, even if the resin physical properties are suitable, making a product may be impossible due to striae defects and the development of such products may have to be abandoned. In addition, in a case of a thermosetting resin, since a monomer preparation liquid itself has a pot life, it may not be possible to efficiently carry out production given that it is necessary to use the monomer preparation liquid up within the pot life. In addition, in a case of conducting underwater polymerization known in the related art, there are problems in that expensive facility investment is necessary, a production efficiency is decreased, and the like.

Solution to Problem

As a result of intensive investigations to solve the above-mentioned problems, the present inventors found that blending a specific compound in a polymerizable composition effectively reduces striae during polymerization.

That is, it is possible to illustrate the present invention as follows.

[1] A polymerizable composition for an optical material, including:
one or two or more compounds selected from the group consisting of component (A) and component (B), and a polymerizable compound.
(A) an ester compound represented by General Formula (1)

(1)

(in General Formula (1), $R_1$ represents a hydrogen atom, a linear alkyl group having 1 to 20 carbon atoms, a branched alkyl group having 3 to 20 carbon atoms, a linear hydrocarbon group having 2 to 20 carbon atoms and having one or more unsaturated bonds, or a branched hydrocarbon group having 3 to 20 carbon atoms and having one or more unsaturated bonds, and $R_2$ represents a polyoxyalkylene group represented by General Formula (2))

(2)

(in General Formula (2), a plurality of present $R_3$ may be the same or different and each $R_3$ represents a hydrogen atom or a methyl group, and n represents an integer of 2 to 20)

(B) an ether compound represented by General Formula (3)

$$R_4—O—R_5 \quad (3)$$

(in General Formula (3), $R_4$ represents a linear alkyl group having 1 to 20 carbon atoms, a branched alkyl group having 3 to 20 carbon atoms, a linear hydrocarbon group having 2 to 20 carbon atoms and having one or more unsaturated bonds, or a branched hydrocarbon group having 3 to 20 carbon atoms and having one or more unsaturated bonds, and $R_5$ represents a linear alkyl group having 1 to 20 carbon atoms, a branched alkyl group having 3 to 20 carbon atoms, or a (poly)oxyalkylene group represented by General Formula (4))

$$—(CH_2CHR_6O)_mH \quad (4)$$

(in General Formula (4), a plurality of present $R_6$ may be the same or different and each $R_6$ represents a hydrogen atom or a methyl group, and m represents an integer of 1 to 20)

[2] The polymerizable composition for an optical material according to [1], further including component (C).

(C) (poly)alkylene glycol represented by General Formula (5)

$$HO(CH_2CHR_7O)_pH \quad (5)$$

(in General Formula (5), a plurality of present $R_7$ may be the same or different and each $R_7$ represents a hydrogen atom or a methyl group, and p represents an integer of 1 to 20)

[3] The polymerizable composition for an optical material according to [2], in which a total weight of components (A), (B) and (C) in the polymerizable composition for an optical material is 0.01 to 7.5% by weight with respect to 100% by weight of the polymerizable composition for an optical material.

[4] The polymerizable composition for an optical material according to [2] or [3], in which component (C) is included in a range of 0.01 to 1% by weight in 100% by weight of the polymerizable composition for an optical material.

[5] The polymerizable composition for an optical material according to anyone of [1] to [4], in which the polymerizable compound is one or two or more types of compounds selected from a polyiso(thio)cyanate compound, a poly(thio) epoxy compound, a polyoxetanyl compound, a polythietanyl compound, a poly(meth)acryloyl compound, a polyalkene compound, an alkyne compound, a poly(thi)ol compound, a polyamine compound, an acid anhydride, or a polycarboxylic acid compound.

[6] A molded article obtainable by curing the polymerizable composition for an optical material according to any one of [1] to [5].

[7] An optical material including the molded article according to [6].

[8] A plastic lens including the optical material according to [7].

[9] A method for manufacturing an optical material, including cast polymerizing the polymerizable composition for an optical material according to any one of [1] to [5].

Advantageous Effects of Invention

According to the present invention, it is possible to effectively reduce striae during polymerization.

DESCRIPTION OF EMBODIMENTS

Description will be given of the polymerizable composition for an optical material according to the present invention based on the following embodiments.

The polymerizable composition for an optical material (also simply referred to below as "polymerizable composition" as appropriate) of the present embodiment includes an ester compound of component (A) or an ether compound of component (B), and a polymerizable compound. In addition, in the present embodiment, the polymerizable composition includes one or two or more compounds selected from the group consisting of the ester compounds of component (A) and the ether compounds of component (B), and a polymerizable compound.

Description will be given below of each component.

Note that it is possible for each of the components to be contained alone or in a combination of two or more types in the polymerizable composition. In addition, in the present specification, unless otherwise noted, "to" represents from equal to or more than the first value to equal to or less than the second value or less and includes both values.

[Component (A)]

The ester compound of component (A) is a compound represented by General Formula (1).

(in General Formula (1), $R_1$ represents a hydrogen atom, a linear alkyl group having 1 to 20 carbon atoms, a branched alkyl group having 3 to 20 carbon atoms, a linear hydrocarbon group having 2 to 20 carbon atoms and having one or more unsaturated bonds, or a branched hydrocarbon group having 3 to 20 carbon atoms and having one or more unsaturated bonds, and $R_2$ represents a polyoxyalkylene group represented by General Formula (2))

$$—(CH_2CHR_3O)_nH \quad (2)$$

(in General Formula (2), a plurality of present $R_3$ may be the same or different and each $R_3$ represents a hydrogen atom or a methyl group, and n represents an integer of 2 to 20)

In General Formula (1), $R_1$ preferably has 8 to 20 carbon atoms, more preferably 10 to 20, and even more preferably 12 to 18.

In $R_1$ of General Formula (1), the linear alkyl group having 1 to 20 carbon atoms is specifically a group represented by General Formula (6).

$$H—(CH_2)_x— \quad (6)$$

(in General Formula (6), x represents an integer of 1 to 20)

In addition, examples of the C1-C20 linear or C3-C20 branched alkyl group of $R_1$ include a methyl group, an ethyl group, an n-propyl group, an isopropyl group, an n-butyl group, an isobutyl group, a t-butyl group, an n-pentyl group, an isopentyl group, a t-pentyl group, an n-hexyl group, an n-heptyl group, an isoheptyl group, an n-octyl group, an isooctyl group, an n-nonyl group, an isononyl group, an n-decyl group, an isodecyl group, an n-undecyl group, an isoundecyl group, an n-dodecyl group, an isododecyl group, a tridecyl group, a tetradecyl group, a pentadecyl group, a hexadecyl group, a heptadecyl group, an octadecyl group, a nonadecyl group, an icosyl group, a cyclopentyl group, a cyclohexyl group, a cycloheptyl group, a cyclooctyl group, a cyclononyl group, a methylcyclopentyl group, a methylcyclohexyl group, and the like.

From the viewpoint of suppressing striae of the obtainable molded article, the linear hydrocarbon group having 2 to 20 carbon atoms and having one or more unsaturated bonds in $R_1$ of General Formula (1) is preferably a linear hydrocarbon group having 2 to 20 carbon atoms and having one or two unsaturated bonds, more preferably a linear hydrocarbon group having 3 to 20 carbon atoms represented by General Formula (7), or a linear hydrocarbon group having 5 to 20 carbon atoms represented by General Formula (8).

$$H_3C-(CH_2)_y CH=CH-(CH_2)_x- \quad (7)$$

(in General Formula (7), x and y each independently represent an integer of 0 to 17, and x+y is an integer of 0 to 17)

$$H_3C-(CH_2)_z CH=CH-(CH_2)_y CH=CH-(CH_2)_x- \quad (8)$$

(in General Formula (8), x, y, and z each independently represent an integer of 0 to 15, and x+y+z is an integer of 0 to 15)

Examples of the linear hydrocarbon group having 2 to 20 carbon atoms and having 1 or more unsaturated bonds or the branched hydrocarbon group having 3 to 20 carbon atoms and having 1 or more unsaturated bonds in $R_1$ of General Formula (1) include an ethenyl group, a propenyl group, an isopropenyl group, a butenyl group, an isobutenyl group, a pentenyl group, an isopentenyl group, a t-pentenyl group, a hexenyl group, a heptenyl group, an isoheptenyl group, an octenyl group, an isooctenyl group, a nonenyl group, an isononenyl group, a decenyl group, an isodecenyl group, an undecenyl group, an isoundecenyl group, a dodecenyl group, an isododecenyl group, a tridecenyl group, a tetradecenyl group, a pentadecenyl group, a hexadecenyl group, a heptadecenyl group, an octadecenyl group, a nonadecenyl group, an icosenyl group, and the like.

From the viewpoint of improving the balance between the effect of suppressing striae of the obtainable molded article and the effect of improving the transparency of the molded article while increasing the pot life of the polymerizable composition, $R_1$ of General Formula (1) is preferably a linear alkyl group having 1 to 20 carbon atoms, a linear hydrocarbon group having 2 to 20 carbon atoms and having one or more unsaturated bonds, a branched alkyl group having 3 to 20 carbon atoms, or a branched hydrocarbon group having 3 to 20 carbon atoms and having one or more unsaturated bonds. That is, the ester compound of General Formula (1) is preferably a polyoxyalkylene fatty acid ester.

In $R_2$ in General Formula (1), a plurality of $R_3$ present in General Formula (2) may be the same or different and represent a hydrogen atom or a methyl group, and, from the viewpoint of suppressing striae of the obtainable molded article, a hydrogen atom is preferable.

In addition, in $R_2$ in General Formula (1), n in General Formula (2) is an integer of 2 to 20, and, from the viewpoint of suppressing striae of the obtainable molded article, is preferably an integer of 2 to 18.

When the polymerizable composition includes component (A), from the viewpoint of improving the balance between the effect of suppressing striae of the obtainable molded article and the effect of improving the transparency of the molded article while increasing the pot life of the polymerizable composition, component (A) preferably includes two or more types of compounds, component (A) preferably includes a compound in which $R_1$ is an alkyl group, and a compound in which $R_1$ is a hydrocarbon group having an unsaturated bond, and component (A) more preferably includes a compound in which $R_1$ is a linear alkyl group, a compound in which $R_1$ is a hydrocarbon group having one unsaturated bond, and a compound in which $R_1$ is a hydrocarbon group having two unsaturated bonds.

In addition, the polymerizable composition may include a plurality of compounds in which $R_1$ or $R_2$ are different as the component (A), more specifically, component (A) may include a plurality of compounds in which $R_1$ or n are different.

When the polymerizable composition includes component (A), the content of component (A) in the polymerizable composition is preferably 0.01 to 7.5% by weight with respect to 100% by weight of the polymerizable composition, more preferably 0.01 to 4% by weight, even more preferably 0.03 to 2.5% by weight, yet more preferably 0.05 to 1% by weight, and still more preferably 0.1 to 0.5% by weight.

[Component (B)]

The ether compound of component (B) is a compound represented by General Formula (3).

$$R_4-O-R_5 \quad (3)$$

(in General Formula (3), $R_4$ represents a linear alkyl group having 1 to 20 carbon atoms, a branched alkyl group having 3 to 20 carbon atoms, a linear hydrocarbon group having 2 to 20 carbon atoms and having one or more unsaturated bonds, or a branched hydrocarbon group having 3 to 20 carbon atoms having one or more unsaturated bonds, and $R_5$ represents a linear alkyl group having 1 to 20 carbon atoms, a branched alkyl group having 3 to 20 carbon atoms, or a (poly)oxyalkylene group represented by General Formula (4))

$$-(CH_2CHR_6O)_m H \quad (4)$$

(in General Formula (4), a plurality of present $R_6$ may be the same or different and each $R_6$ represents a hydrogen atom or a methyl group, and m represents an integer of 1 to 20)

In General Formula (3), from the viewpoint of suppressing striae of the obtainable molded article, $R_4$ preferably has 10 to 20 carbon atoms, more preferably 12 to 20, and even more preferably 15 to 19.

Specific examples of the linear alkyl group having 1 to 20 carbon atoms or the branched alkyl group having 3 to 20 carbon atoms in $R_4$ in General Formula (3) include the groups described above as $R_1$ in General Formula (1). In addition, in General Formula (3), the linear alkyl group having 1 to 20 carbon atoms in $R_4$ is specifically a group represented by General Formula (6) described above in $R_1$ in General Formula (1).

Specific examples of the linear hydrocarbon group having 2 to 20 carbon atoms and having one or more unsaturated bonds or the branched hydrocarbon group having 3 to 20 carbon atoms and having one or more unsaturated bonds in $R_4$ in General Formula (3) include the groups described above as $R_1$ in General Formula (1). In addition, specific examples of the linear hydrocarbon group having 2 to 20 carbon atoms and having one or more unsaturated bonds in $R_4$ in General Formula (3) include the groups represented by General Formula (7) or (8) described above in $R_1$ in General Formula (1).

In $R_4$ of General Formula (3), from the viewpoint of suppressing striae of the obtainable molded article, the linear hydrocarbon group having 2 to 20 carbon atoms and having one or more unsaturated bonds is preferably a linear hydrocarbon groups having 2 to 20 carbon atoms and having one or two unsaturated bonds, more preferably a linear hydrocarbon group having 3 to 20 carbon atoms represented by General Formula (7) described above in $R_1$ in General Formula (1) or a linear hydrocarbon group having 5 to 20 carbon atoms represented by General Formula (8) described above in $R_1$ in General Formula (1), and even more preferably a linear hydrocarbon group having 3 to 20 carbon atoms represented by General Formula (7) described above in $R_1$ in General Formula (1).

In $R_5$ in General Formula (3), a plurality of present $R_6$ present in General Formula (4) may be the same or different and represent a hydrogen atom or a methyl group and, from the viewpoint of suppressing striae of the obtainable molded article, are preferably hydrogen atoms.

In addition, in $R_5$ in General Formula (3), m in General Formula (4) is an integer of 1 to 20 and, from the viewpoint of suppressing striae of the obtainable molded article, is preferably an integer of 1 to 18.

From the viewpoint of suppressing striae of the obtainable molded article, component (B) is preferably a compound having a (poly)oxyalkylene group, and more preferably a compound having a polyoxyalkylene group.

When the polymerizable composition includes component (B), from the viewpoint of improving the balance between the effect of suppressing striae of the obtainable molded article and the effect of improving the transparency of the molded article while increasing the pot life of the polymerizable composition, component (B) preferably includes two or more types of compounds, component (B) preferably includes a compound in which $R_4$ is an alkyl group and a compound in which $R_4$ is a hydrocarbon group having an unsaturated bond, and component (B) more preferably includes a compound in which $R_4$ is a linear alkyl group and a compound in which $R_4$ is a hydrocarbon group having one unsaturated bond.

In addition, the polymerizable composition may include a plurality of compounds in which $R_4$ or $R_5$ are different as component (B), and more specifically, component (B) may include a plurality of compounds in which $R_4$ or m are different.

When the polymerizable composition contains component (B), the content of component (B) in the polymerizable composition is preferably 0.01 to 7.5% by weight with respect to 100% by weight of the polymerizable composition, more preferably 0.01 to 1% by weight, even more preferably 0.03 to 0.5% by weight, still more preferably 0.05 to 0.3% by weight, and yet more preferably 0.05 to 0.2% by weight.

The polymerizable composition may include either one of components (A) and (B) or may include both. From the viewpoint of improving the balance between the effect of suppressing striae of the obtainable molded article and the effect of improving the transparency of the molded article while increasing the pot life of the polymerizable composition, the polymerizable composition preferably includes components (A) and (B).

When the polymerizable composition includes components (A) and (B), $R_1$ in General Formula (1) and $R_4$ in General Formula (3) may be the same group or different groups and, in addition, $R_2$ in General Formula (1) and $R_5$ in General Formula (3) may be the same group or different groups.

The total weight of components (A) and (B) in the polymerizable composition is preferably 0.01 to 7.5% by weight with respect to 100% by weight of the polymerizable composition, more preferably 0.02% by weight to 5% by weight, even more preferably 0.06 to 3% by weight, and yet more preferably 0.1 to 1.3% by weight.

The polymerizable composition may further include a modifier other than components (A) and (B).

For example, the polymerizable composition may further include a compound having the structure represented by General Formula (1) and in which $R_2$ is represented by General Formula (2) and n=1.

In addition, the polymerizable composition may further include a compound having the structure represented by General Formula (1) and in which $R_2$ is a linear alkyl group having 1 to 20 carbon atoms or a branched alkyl group having 3 to 20 carbon atoms.

In addition, the polymerizable composition may further include component (C).

(C) (poly)alkylene glycol represented by General Formula (5)

$$HO(CH_2CHR_7O)_pH \quad\quad\quad (5)$$

(in General Formula (5), a plurality of present $R_7$ may be the same or different and each $R_7$ represents a hydrogen atom or a methyl group, and p represents an integer of 1 to 20)

In General Formula (5), a plurality of present $R_7$ may be the same or different and each $R_7$ represents a hydrogen atom or a methyl group and, from the viewpoint of suppressing striae of the obtainable molded article, $R_7$ is preferably a hydrogen atom.

In addition, in General Formula (5), p is an integer of 1 to 20 and is preferably an integer of 2 to 20, from the viewpoint of suppressing striae of the obtainable molded article. The polymerizable composition may include a plurality of compounds in which p is different as component (C).

From the viewpoint of suppressing striae of the obtainable molded article, component (C) is preferably polyoxyalkylene glycol, and more preferably polyethylene glycol or polypropylene glycol.

In addition, when the polymerizable composition includes component (C), from the viewpoint of increasing the effect of suppressing striae of the obtainable molded article, the content of component (C) in the polymerizable composition is preferably 0.01 to 1% by weight with respect to 100% by weight of the polymerizable composition, more preferably 0.05 to 0.5% by weight, and even more preferably 0.05 to 0.3% by weight.

In addition, when component (C) includes a polyol compound, from the viewpoint of increasing the effect of the polyol compound as a polymerizable compound in the polymerizable composition, the content of component (C) is preferably 50% by weight or less with respect to 100% by weight of the polymerizable composition, more preferably 40% by weight or less, and even more preferably 30% by weight or less.

In addition, from the viewpoint of improving the balance between the effect of suppressing striae of the obtainable molded article and the effect of improving the transparency of the molded article while increasing the pot life of the polymerizable composition, the polymerizable composition of the present embodiment preferably includes components (A) and (B) as modifiers;
more preferably includes components (A), (B), and (C);
and even more preferably includes the compounds represented by General Formulas (9) to (14). The compounds represented by General Formulas (9) to (11) are components (A), the compounds represented by General Formulas (12) and (13) are components (B), and the compound represented by General Formula (14) is component (C).

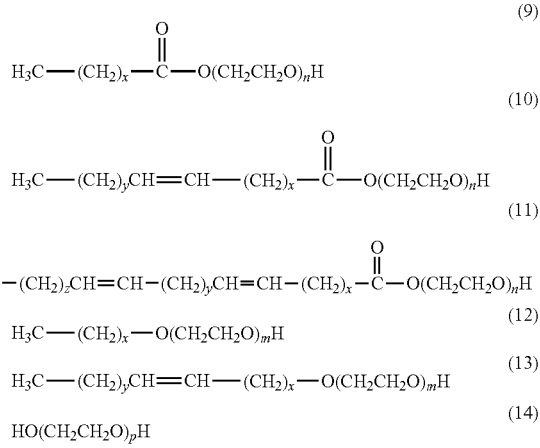

In General Formulas (9) to (14), x, y, z, m, n and p are the same as x, y, z, m, and p respectively in any of General Formulas (2) and (4) to (8).

From the viewpoint of improving the balance between the effect of increasing the pot life of the polymerizable composition, the effect of improving the transparency of the obtainable molded article, and the effect of suppressing striae in the molded article, x in General Formula (9) is preferably 9 to 17, and more preferably 11 to 15. From the same viewpoint, n is preferably 2 to 18, and more preferably 2 to 16.

From the same viewpoint, x+y in General Formula (10) is preferably 9 to 17, and more preferably 11 to 15. From the same viewpoint, n is preferably 2 to 18, and more preferably 2 to 17.

From the same viewpoint, x+y+z in General Formula (11) is preferably 9 to 15, and more preferably 11 to 13. From the same viewpoint, n is preferably 2 to 18, and more preferably 2 to 16.

From the same viewpoint, x in General Formula (12) is preferably 12 to 20, and more preferably 14 to 18. From the same viewpoint, m is preferably 1 to 19, and more preferably 2 to 18.

In addition, from the same viewpoint, x+y in General Formula (13) is preferably 12 to 17, and more preferably 14 to 16. From the same viewpoint, m is preferably 1 to 19, and more preferably 1 to 18.

In addition, from the same viewpoint, p in General Formula (14) is preferably 1 to 20, and more preferably 2 to 20.

The content of the modifiers of components (A) to (C) in the polymerizable composition of the present embodiment is appropriately selected depending on the type and combination of the polymerizable compounds, the types and amounts used of modifiers such as polymerization catalysts and internal mold releasing agents, the physical properties of the resin obtainable by polymerizing the polymerizable composition, and the shape of the molded article.

From the viewpoint of increasing the effect of suppressing striae of the obtainable molded article, the total weight of (A), (B) and (C) in the polymerizable composition is preferably 0.01 to 7.5% by weight with respect to 100% by weight of the polymerizable composition, more preferably 0.05 to 5% by weight, even more preferably 0.1 to 2% by weight, still more preferably 0.1 to 1% by weight, and yet more preferably 0.2 to 0.6% by weight.

In addition, when component (C) includes a polyol compound, from the viewpoint of increasing the effect of the polyol compound as a polymerizable compound in the polymerizable composition, the total weight of (A), (B), and (C) in the polymerizable composition is preferably 57.5% by weight or less with respect to 100% by weight of the polymerizable composition, more preferably 45% by weight or less, and even more preferably 33% by weight or less.

[Polymerizable Compound]

Next, a description will be given of the polymerizable compound included in the polymerizable composition of the present embodiment.

The polymerizable compounds include polymerizable compounds having at least one or more polymerizable functional groups capable of self-polymerization, copolymerization, or addition polymerization even in the presence or absence of additives such as an initiator or a catalyst which are added as necessary. Here, the polymerizable compound refers to a compound other than component (A) and component (B). Specifically, in the polymerizable composition, when one or two or more compounds selected from the group consisting of component (A) and component (B) are compounds having one or more polymerizable functional groups in the molecule, the polymerizable composition includes a polymerizable compound other than component (A) and component (B).

Regarding compounds having polymerizable functional groups capable of self-polymerization, copolymerization, or addition polymerization, more specific examples thereof include a polyiso(thio)cyanate compound having two or more isocyanato groups or isothiocyanato groups, a poly(thio)epoxy compound having two or more epoxy groups and thioepoxy groups, a polyoxetanyl compound having two or more oxetanyl groups, a (poly) thietanyl compound having two or more thietanyl groups or an oxetanyl group and thietanyl group, a poly(meth)acryloyl compound having two or more of a methacryloyloxy group, an acryloyloxy group, a methacryloylthio group, an acryloylthio group, a methacrylamide group, or an acrylamide group, a polyalkene compound having two or more polymerizable carbon-carbon double bond groups other than a methacryloyloxy group, an acryloyloxy group, a methacryloylthio group, an acryloylthio group, a methacrylamide group, or an acrylamide group, an alkyne compound having one or more polymerizable carbon-carbon triple bond groups, a poly(thi)ol compound other than component (C) having two or more hydroxy groups or mercapto groups (not including an alcohol used as a solvent), a polyamine compound having two or more amino groups or secondary amino groups, an acid anhydride having one or more acid anhydride groups, a polycarboxylic acid compound having two or more carboxyl groups, or the like.

In addition, when the polymerizable composition includes component (C) described above and component (C) includes a polyol compound, the polyol compound may function as a polymerizable compound.

Examples of polyiso(thio)cyanate compounds include aliphatic polyisocyanate compounds such as tetramethylene diisocyanate, pentamethylene diisocyanate, pentamethylene diisocyanate nurate, hexamethylene diisocyanate, octamethylene diisocyanate, 2,2,4-trimethylhexamethylene diisocyanate, 2,4,4-trimethylhexamethylene diisocyanate, lysine diisocyanato methyl ester, lysine triisocyanate, and xylylene diisocyanate; alicyclic polyisocyanate compounds such as isophorone diisocyanate, bis(isocyanatomethyl)cyclohexane, bis(4-isocyanatocyclohexyl)methane, dicyclohexyldimethylmethane isocyanate, 2,5-bis(isocyanatomethyl)

bicyclo-[2.2.1]-heptane, 2,6-bis(isocyanatomethyl)bicyclo-[2.2.1]-heptane, 3,8-bis(isocyanatomethyl)tricyclodecane, 3,9-bis(isocyanatomethyl)tricyclodecane, 4,8-bis(isocyanatomethyl)tricyclodecane, and 4,9-bis(isocyanatomethyl) tricyclodecane; aromatic polyisocyanate compounds such as tolylene diisocyanate, 4,4'-diphenylmethane diisocyanate, diphenyl sulfide-4,4-diisocyanate, and phenylene diisocyanate; heterocyclic polyisocyanate compounds such as 2,5-diisocyanatothiophene, 2,5-bis(isocyanatomethyl)thiophene, 2,5-diisocyanatotetrahydrothiophene, 2,5-bis(isocyanatomethyl)tetrahydrothiophene, 3,4-bis(isocyanatomethyl) tetrahydrothiophene, 2,5-diisocyanato-1,4-dithiane, 2,5-bis(isocyanatomethyl)-1,4-dithiane, 4,5-diisocyanato-1,3-dithiolane, and 4,5-bis(isocyanatomethyl)-1,3-dithiolane; aliphatic polyisothiocyanate compounds such as hexamethylene diisothiocyanate, lysine diisothiocyanate methyl ester, lysine triisothiocyanate, m-xylylene diisothiocyanate, bis(isothiocyanatomethyl)sulfide, bis(isothiocyanatoethyl)sulfide, and bis(isothiocyanatoethyl)disulfide; alicyclic polyisothiocyanate compounds such as isophorone diisothiocyanate, bis(isothiocyanatomethyl)cyclohexane, bis(isothiocyanatocyclohexyl)methane, cyclohexane diisothiocyanate, methylcyclohexane diisothiocyanate, 2,5-bis(isothiocyanatomethyl)bicyclo-[2.2.1]-heptane, 2,6-bis(isothiocyanatomethyl)bicyclo-[2.2.1]-heptane, 3,8-bis(isothiocyanatomethyl)tricyclodecane, 3,9-bis(isothiocyanatomethyl) tricyclodecane, 4,8-bis(isothiocyanatomethyl)tricyclodecane, and 4,9-bis(isothiocyanatomethyl)tricyclodecane; aromatic polyisothiocyanate compounds such as tolylene diisothiocyanate, 4,4-diphenylmethane diisothiocyanate, and diphenyl disulfide-4,4-diisothiocyanate; sulfur-containing heterocyclic polyisothiocyanate compounds such as 2,5-diisothiocyanatothiophene, 2,5-bis(isothiocyanatomethyl) thiophene, 2,5-isothiocyanatotetrahydrothiophene, 2,5-bis(isothiocyanatomethyl)tetrahydrothiophene, 3,4-bis(isothiocyanatomethyl)tetrahydrothiophene, 2,5-diisothiocyanato-1,4-dithiane, 2,5-bis(isothiocyanatomethyl)-1,4-dithiane, 4,5-diisothiocyanato-1,3-dithiolane, and 4,5-bis(isothiocyanatomethyl)-1,3-dithiolane, and the like.

Examples of poly(thio)epoxy compounds include polyepoxy compounds such as bisphenol A diglycidyl ether; chain aliphatic 2,3-epoxypropylthio compounds such as bis(2,3-epoxypropyl)sulfide, bis(2,3-epoxypropyl)disulfide, bis(2,3-epoxypropylthio)methane, 1,2-bis(2,3-epoxypropylthio)ethane, 1,2-bis(2,3-epoxypropylthio)propane, 1,3-bis(2,3-epoxypropylthio)propane, 1,3-bis(2,3-epoxypropylthio)-2-methylpropane, 1,4-bis(2,3-epoxypropylthio)butane, 1,4-bis(2,3-epoxypropylthio)-2-methylbutane, 1,3-bis(2,3-epoxypropylthio)butane, 1,5-bis(2,3-epoxypropylthio)pentane, 1,5-bis(2,3-epoxypropylthio)-2-methylpentane, 1,5-bis(2,3-epoxypropylthio)-3-thiapentane, 1,6-bis(2,3-epoxypropylthio)hexane, 1,6-bis(2,3-epoxypropylthio)-2-methylhexane, 3,8-bis(2,3-epoxypropylthio)-3,6-dithiaoctane, 1,2,3-tris(2,3-epoxypropylthio)propane, 2,2-bis(2,3-epoxypropylthio)-1,3-bis(2,3-epoxypropylthiomethyl)p ropane, 2,2-bis(2,3-epoxypropylthiomethyl)-1-(2,3-epoxypropylthio) butane, 1,5-bis(2,3-epoxypropylthio)-2-(2,3-epoxypropylthiomethyl)-3-thiapentane, 1,5-bis(2,3-epoxypropylthio)-2,4-bis(2,3-epoxypropylthiomethyl)-3-thiapentane, 1-(2,3-epoxypropylthio)-2,2-bis(2,3-epoxypropylthiomethyl)-4-thiahexane, 1,5,6-tris(2,3-epoxypropylthio)-4-(2,3-epoxypropylthiomethyl)-3-thiahexane, 1,8-bis(2,3-epoxypropylthio)-4-(2,3-epoxy propylthiomethyl)-3,6-dithiaoctane, 1,8-bis(2,3-epoxypropylthio)-4,5-bis(2,3-epoxypropylthiomethyl)-3,6-dithiaoctane, 1,8-bis(2,3-epoxypropylthio)-4,4-bis(2,3-epoxypropylthiomethyl)-3,6-dithiaoctane, 1,8-bis(2,3-epoxypropylthio)-2,5-bis(2,3-epoxypropylthiomethyl)-3,6-dithiaoctane, 1,8-bis(2,3-epoxypropylthio)-2,4,5-tris(2,3-epoxy propylthiomethyl)-3,6-dithiaoctane, 1,1,1-tris[[2-(2,3-epoxypropylthio)ethyl]thiomethyl]-2-(2,3-epoxypropylthio)ethane, 1,1,2,2-tetrakis[[2-(2,3-epoxypropylthio)ethyl]thiomethyl]ethane, 1,11-bis(2,3-epoxypropylthio)-4,8-bis(2,3-epoxypropylthiomethyl)-3,6,9-trithiaundecane, 1,11-bis(2,3-epoxypropylthio)-4,7-bis(2,3-epoxypropylthiomethyl)-3,6,9-trithiaundecane, and 1,11-bis(2,3-epoxypropylthio)-5,7-bis(2,3-epoxypropylthiomethyl)-3,6,9-trithiaundecane; cyclic aliphatic 2,3-epoxypropylchio compounds such as 1,3-bis(2,3-epoxypropylthio)cyclohexane, 1,4-bis(2,3-epoxypropylthio)cyclohexane, 1,3-bis(2,3-epoxypropylthiomethyl)cyclohexane, 1,4-bis(2,3-epoxypropylthiomethyl)cyclohexane, 2,5-bis(2,3-epoxypropylthiomethyl)-1,4-dithiane, 2,5-bis[[2-(2,3-epoxypropylthio)ethyl]thiomethyl]-1,4-dithiane, and 2,5-bis(2,3-epoxypropylthiomethyl)-2,5-dimethyl-1,4-dithiane; aromatic 2,3-epoxypropylthio compounds such as 1,2-bis(2,3-epoxypropylthio)benzene, 1,3-bis(2,3-epoxypropylthio)benzene, 1,4-bis(2,3-epoxypropylthio)benzene, 1,2-bis(2,3-epoxypropylthiomethyl)benzene, 1,3-bis(2,3-epoxypropylthiomethyl)benzene, 1,4-bis(2,3-epoxypropylthiomethyl)benzene, bis[4-(2,3-epoxypropylthio)phenyl]methane, 2,2-bis[4-(2,3-epoxypropylthio)phenyl]propane, bis[4-(2,3-epoxypropylthio)phenyl]sulfide, bis[4-(2,3-epoxypropylthio)phenyl]sulfone, 4,4'-bis(2,3-epoxypropylthio)biphenyl and the like.

Examples of polyoxetanyl compounds include 3-ethyl-3-hydroxymethyloxetane, 1,4-bis{[(3-ethyl-3-oxetanyl) methoxy]methyl}benzene, 3-ethyl-3-(phenoxymethyl)oxetane, di[1-ethyl-(3-oxetanyl)]methyl ether, 3-ethyl-3-(2-ethylhexyloxymethyl)oxetane, phenol novolac oxetane, and the like.

Examples of polythietanyl compounds include 1-{4-(6-mercaptomethylthio)-1,3-dithianylthio}-3-{2-(1,3-dithietanyl)}methyl-7,9-bis(mercaptomethylthio)-2,4,6,10-tetrathiaundecane, 1,5-bis{4-(6-mercaptomethylthio)-1,3-dithianylthio}-3-{2-(1,3-di thietanyl)}methyl-2,4-dithiapentane, 4,6-bis[3-{2-(1,3-dithietanyl)}methyl-5-mercapto-2,4-dithiapentylthio]-1,3-dithiane, 3-{2-(1,3-dithietanyl)}methyl-7,9-bis(mercaptomethylthio)-1,11-dimercapto-2,4,6,10-tetrathiaundecane, 9-{2-(1,3-dithietanyl)}methyl-3,5,13,15-tetrakis(mercaptomethylthio)-1,17-dimercapto-2,6,8,10,12,16-hexathiaheptadecane, 3-{2-(1,3-dithietanyl)}methyl-7,9,13,15-tetrakis(mercaptomethylthio)-1,17-dimercapto-2,4,6,10,12,16-hexathiaheptadecane, 3,7-bis{2-(1,3-dithietanyl) }methyl-1,9-dimercapto-2,4,6,8-tetrathianonane, 4,5-bis[1-{2-(1,3-dithietanyl)}-3-mercapto-2-thiapropylthio]-1,3-dithiolane, 4-[1-{2-(1,3-dithietanyl)}-3-mercapto-2-thiapropylthio]-5-{1,2-bis(mercaptomethylthio)-4-mercapto-3-thiabutylthio}-1,3-dithiolane, 4-{4-(5-mercaptomethylthio-1,3-dithiolanyl)thio}-5-[1-{2-(1,3-di thietanyl)}-3-mercapto-2-thiapropylthio]-1,3-dithiolane, and the like.

Examples of poly(meth)acryloyl compounds include diacryloyl compounds such as ethylene glycol diacrylate, 1,3-butylene glycol diacrylate, 1,4-butanediol diacrylate, 1,6-hexanediol diacrylate, cyclohexane dimethanol diacrylate, alkoxylated hexanediol diacrylate, neopentyl glycol diacrylate, caprolactone modified neopentyl glycol hydroxypivalate diacrylate, cyclohexane dimethanol diacrylate, diethylene glycol diacrylate, dipropylene glycol diacrylate, bisphenol A diacrylate, ethoxylated bisphenol A diacrylate, hydroxy pivaldehyde modified trimethylolpropane diacrylate, neopentyl glycol diacrylate, polyethylene glycol diacrylate, propoxylated neopentyl glycol diacrylate, tetraethylene glycol diacrylate, tricyclodecane dimethanol diacrylate, triethylene glycol diacrylate, tripropylene glycol diacrylate; triacryloyl compounds such as glycerol triacrylate, ethoxylated trimethylolpropane triacrylate, pentaerythritol triacrylate, propoxylated glyceryl triacrylate, propoxylated trimethylolpropane triacrylate, and tris(2-hydroxyethyl)isocyanurate triacrylate; tetra-, penta-, or hexa-acryloyl compounds such as ditrimethylolpropane tetraacrylate, dipentaerythritol pentaacrylate, ethoxylated pentaerythritol tetraacrylate, pentaerythritol tetraacrylate, caprolactone modified dipentaerythritol hexaacrylate, and the like.

Examples of polyalkene compounds include polyethylene, polypropylene, polyisobutylene, diethylene glycol bis (allyl carbonate), divinylbenzene, and the like.

Examples of alkyne compounds include hydrocarbon-based alkynes such as 2-butyne, 2-pentyne, 2-hexyne, 3-hexyne, 2-heptyne, 3-heptyne, 2-octyne, 3-octyne, 4-octyne, diisopropylacetylene, 2-nonyne, 3-nonyne, 4-nonyne, 5-nonyne, 2-decyne, 3-decyne, 4-decyne, 5-decyne, di-tert-butylacetylene, diphenylacetylene, dibenzylacetylene, methyl-iso-propylacetylene, methyl-tert-butylacetylene, ethyl-iso-propylacetylene, ethyl-tert-butylacetylene, n-propyl-iso-propyl acetylene, n-propyl-tert-butyl acetylene, phenyl methyl acetylene, phenyl ethyl acetylene, phenyl-n-propylacetylene, phenyl-iso-propylacetylene, phenyl-n-butyl acetylene, and phenyl-tert-butyl acetylene; alkynyl alcohols such as acetylene diol, propynol, butynol, pentynol, hexynol, hexynediol, heptynol, heptynediol, octynol, and octynediol; alkynylamines of which some or all of the OH groups of the alkynyl alcohols are substituted with an $NH_2$ group, and the like.

Among the poly(thi)ol compounds other than component (C) (not including alcohols used as solvents), examples of polyol compounds include aliphatic polyols such as butylene glycol, neopentyl glycol, glycerin, trimethylolethane, trimethylolpropane, ditrimethylolpropane, butanetriol, 1,2-methylglucoside, pentaerythritol, dipentaerythritol, tripentaerythritol, sorbitol, erythritol, threitol, ribitol, arabinitol, xylitol, allitol, mannitol, dolcitol, iditol, glycol, inositol, hexanetriol, triglycerol, diglycerol, triethylene glycol, polyethylene glycol, tris(2-hydroxyethyl)isocyanurate, cyclobutanediol, cyclopentanediol, cyclohexanediol, cycloheptanediol, cyclooctanediol, cyclohexanedimethanol, hydroxypropylcyclohexanol, tricyclo[5.2.1.0$^{2,6}$]decane-dimethanol, bicyclo[4.3.0]-nonanediol, dicyclohexanediol, tricyclo[5.3.1.1]dodecanediol, bicyclo[4.3.0]nonanedimethanol, tricyclo[5.3.1.1]dodecane diethanol, hydroxypropyltricyclo[5.3.1.1]dodecanol, spiro[3.4]octanediol, butylcyclohexanediol, 1,1'-bicyclohexylidene diol, cyclohexanetriol, maltitol, and lactose;

aromatic polyols such as dihydroxy naphthalene, trihydroxynaphthalene, tetrahydroxynaphthalene, dihydroxybenzene, benzenetriol, biphenyltetraol, pyrogallol, (hydroxynaphthyl)pyrogallol, trihydroxyphenanthrene, bisphenol A, bisphenol F, xylylene glycol, di(2-hydroxyethoxy)benzene, bisphenol A-bis-(2-hydroxyethyl ether), tetrabromobisphenol A, and tetrabromobisphenol A-bis-(2-hydroxyethyl ether); halogenated polyols such as dibromoneopentyl glycol; and polymer polyols such as epoxy resins. In the present embodiment, it is possible to use at least one type selected from the above in a combination.

In addition, as the polyol compound, it is also possible to use other polyol compounds such as condensation reaction products of organic acids such as oxalic acid, glutamic acid, adipic acid, acetic acid, propionic acid, cyclohexane carboxylic acid, β-oxocyclohexane propionic acid, dimer acid, phthalic acid, isophthalic acid, salicylic acid, 3-bromopropionic acid, 2-bromoglycol, dicarboxycyclohexane, pyromellitic acid, butanetetracarboxylic acid, and bromophthalic acid and the above polyols;

addition reaction products of the polyols above and alkylene oxides such as ethylene oxide or propylene oxide;

addition reaction products of an alkylene polyamine and an alkylene oxide such as ethylene oxide or propylene oxide;

furthermore, bis-[4-(hydroxyethoxy)phenyl]sulfide, bis-[4-(2-hydroxypropoxy)phenyl]sulfide, bis-[4-(2,3-dihydroxypropoxy)phenyl]sulfide, bis-[4-(4-hydroxycyclohexyloxy)phenyl]sulfide, bis-[2-methyl-4-(hydroxyethoxy)-6-butylphenyl]sulfide and compounds in which ethylene oxide and/or propylene oxide having an average of 3 molecules or less per hydroxyl group are added to these compounds;

polyols containing sulfur atoms such as di-(2-hydroxyethyl) sulfide, 1,2-bis-(2-hydroxyethylmercapto) ethane, bis(2-hydroxyethyl)disulfide, 1,4-dithiane-2,5-diol, bis(2,3-dihydroxypropyl)sulfide, tetrakis(4-hydroxy-2-thiabutyl)methane, bis(4-hydroxy phenyl)sulfone (bisphenol S), tetrabromobisphenol S, tetramethyl bisphenol S, 4,4'-thiobis(6-tert-butyl-3-methylphenol), 1,3-bis(2-hydroxyethylthioethyl)-cyclohexane and the like. In the present embodiment, it is possible to use at least one type selected from the above in a combination.

Examples of polythiol compounds include aliphatic polythiol compounds such as methanedithiol, 1,2-ethanedithiol, 1,2,3-propanetrithiol, 1,2-cyclohexanedithiol, bis(2-mercaptoethyl)ether, tetrakis(mercaptomethyl)methane, diethylene glycol bis(2-mercaptoacetate), diethylene glycol bis(3-mercaptopropionate), ethylene glycol bis(2-mercaptoacetate), ethylene glycol bis(3-mercaptopropionate), trimethylolpropane tris(2-mercaptoacetate), trimethylolpropane tris(3-mercaptopropionate), trimethylolethane tris(2-mercaptoacetate), trimethylolethane tris(3-mercaptopropionate), pentaerythritol tetrakis(2-mercaptoacetate), pentaerythritol tetrakis(3-mercaptopropionate), bis(mercaptomethyl)sulfide, bis(mercaptomethyl)disulfide, bis(mercaptoethyl)sulfide, bis(mercaptoethyl)disulfide, bis(mercaptopropyl)sulfide, bis(mercaptomethylthio)methane, bis(2-mercaptoethylthio) methane, bis(3-mercaptopropylthio)methane, 1,2-bis (mercaptomethylthio) ethane, 1,2-bis(2-mercaptoethylthio) ethane, 1,2-bis(3-mercaptoproylthio)ethane, 1,2,3-tris (mercaptomethylthio)propane, 1,2,3-tris(2-mercaptoethylthio)propane, 1,2,3-tris(3-mercaptopropylthio)propane, 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, tetrakis(mercaptomethylthiomethyl)methane, tetrakis(2-mercaptoethylthiomethyl)methane, tetrakis(3-mercaptopropylthiomethyl)methane, bis(2,3-dimercaptopropyl)sulfide, 2,5-dimercaptomethyl-1,4-dithiane, 2,5-dimercapto-1,4-dithiane, 2,5-dimercaptomethyl-2,5-dimethyl-1,4-dithiane and esters of these thioglycolic acids and mercaptopropionic acids, hydroxymethyl sulfide bis(2-mercaptoacetate), hydroxymethyl sulfide bis(3-mercaptopropionate), hydroxyethyl sulfide bis(2-mercaptoacetate), hydroxyethyl sulfide bis(3-mercaptopropionate), hydroxymethyl disulfide bis(2-mercaptoacetate), hydroxyethyl disulfide bis(3-mercaptopropinate), hydroxyethyl disulfide bis(2-mercaptoacetate), hydroxyethyl disulfide bis(3-mercaptopropionate), 2-mercaptoethyl ether bis(2-mercaptoacetate), 2-mercaptoethyl ether bis(3-mercaptopropionate), thiodiglycolic acid bis(2-mercaptoethyl ester), thiodipropionic acid bis(2-mercaptoethyl ester), dithiodiglycolic acid bis(2-mercaptoethyl ester), dithiodipropionic acid bis(2- mercaptoethyl ester), 1,1,3,3-tetrakis(mercaptomethylthio) propane, 1,1,2,2-tetrakis(mercaptomethylthio)ethane, 4,6-bis(mercaptomethylthio)-1,3-dithiane, tris(mercapto0 methylthio)methane, and tris(mercaptoethylthio)methane; aromatic polythiol compounds such as 1,2-dimercaptobenzene, 1,3-dimercaptobenzene, 1,4-dimercaptobenzene, 1,2-bis(mercaptomethyl)benzene, 1,3-bis(mercaptomethyl)benzene, 1,4-bis(mercaptomethyl)benzene, 1,2-bis(mercaptoethyl)benzene, 1,3-bis(mercaptoethyl)benzene, 1,4-bis(mercaptoethyl)benzene, 1,3,5-trimercaptobenzene, 1,3,5-tris(mercaptomethyl)benzene, 1,3,5-tris(mercaptomethyleneoxy)benzene, 1,3,5-tris(mercaptoethyleneoxy)benzene, 2,5-toluenedithiol, 3,4-toluenedithiol, 1,5-naphthalenedithiol, and 2,6-naphthalenedithiol; heterocyclic polythiol compounds such as 2-methylamino-4,6-dithiol-sym-triazine, 3,4-thiophenedithiol, bismuthiol, 4,6-bis(mercaptomethylthio)-1,3-dithiane, 2-(2,2-bis(mercaptomethylthio) ethyl)-1,3-dithiane, and the like.

Examples of polyamine compounds include primary polyamine compounds such as ethylenediamine, 1,2- or 1,3-diaminopropane, 1,2-, 1,3-, or 1,4-diaminobutane, 1,5-diaminopentane, 1,6-diaminohexane, 1,7-diaminoheptane, 1,8-diaminooctane, 1,10-diaminodecane, 1,2-, 1,3-, or 1,4-diaminocyclohexane, o-, m- or p-diaminobenzene, 3,4- or 4,4'-diaminobenzophenone, 3,4- or 4,4'-diaminodiphenyl ether, 4,4'-diaminodiphenylmethane, 4,4'-diaminodiphenyl sulfide, 3,3'- or 4,4'-diaminodiphenylsulfone, 2,7-diaminofluorene, 1,5-, 1,8-, or 2,3-diaminonaphthalene, 2,3-, 2,6-, or 3,4-diaminopyridine, 2,4- or 2,6-diaminotoluene, m- or p-xylylenediamine, isophoronediamine, diaminomethylbicycloheptane, 1,3- or 1,4-diaminomethylcyclohexane, 2- or 4-aminopiperidine, 2- or 4-aminomethylpiperidine, 2- or 4-aminoethylpiperidine, N-aminoethylmorpholine, and N-aminopropylmorpholine;

monofunctional secondary amine compounds such as diethylamine, dipropylamine, di-n-butylamine, di-sec-butylamine, diisobutylamine, di-n-pentylamine, di-3-pentylamine, dihexylamine, dioctylamine, di(2-ethylhexyl)amine, methyl hexyl amine, diallylamine, N-methylallylamine, piperidine, pyrrolidine, diphenylamine, N-methylamine, N-ethylamine, dibenzylamine, N-methylbenzylamine, N-ethylbenzylamine, dicyclohexylamine, N-methylaniline, N-ethylaniline, dinaphthylamine, 1-methylpiperazine, and morpholine; secondary polyamine compounds such as N,N'-dimethylethylenediamine, N,N'-dimethyl-1,2-diaminopropane, N,N'-dimethyl-1,3-diaminopropane, N,N'-dimethyl-1,2-diaminobutane, N,N'-dimethyl-1,3-diaminobutane, N,N'-dimethyl-1,4-diaminobutane, N,N'-dimethyl-1,5-diaminopentane, N,N'-dimethyl-1,6-diamino hexane, N,N'-dimethyl-1,7-diaminoheptane, N,N'-diethylethylenediamine, N,N'-diethyl-1,2-diaminopropane, N,N'-diethyl-1,3-diamino propane, N,N'-diethyl-1,2-diaminobutane, N,N'-diethyl-1,3-diaminobutane, N,N'-diethyl-1,4-diaminobutane, N,N'-diethyl-1,5-diaminopentane, N,N'-diethyl-1,6-diaminohexane, N,N'-diethyl-1,7-diaminoheptane, piperazine, 2-methylpiperazine, 2,5-dimethylpiperazine, 2,6-dimethylpiperazine, homopiperazine, 1,1-di-(4-piperidyl) methane, 1,2-di-(4-piperidyl) ethane, 1,3-di-(4-piperidyl) propane, 1,4-di-(4-piperidyl) butane, and tetramethylguanidine; and the like.

Examples of acid anhydrides include succinic anhydride, phthalic anhydride, maleic anhydride, tetrabromophthalic anhydride, tetrahydrophthalic anhydride, trimellitic anhydride, or dodecylsuccinic anhydride, and the like.

Examples of polycarboxylic acid compounds include succinic acid, adipic acid, sebacic acid, azelaic acid, dodecanedioic acid, terephthalic acid, isophthalic acid, orthophthalic acid, phthalic anhydride, tetrahydrophthalic acid, hexahydrophthalic acid, naphthalenedicarboxylic acid, biphenyl dicarboxylic acid, dimer acid, trimellitic acid, pyromellitic acid, ε-caprolactone, and the like.

These polymerizable compounds may be used alone or in a mixture of two or more types.

From the viewpoint of increasing the effect of suppressing striae in the optical lens and the viewpoint of improving the quality such as optical physical properties for the obtainable optical lens, the polymerizable compound is preferably one or two or more types of compounds selected from a polyiso(thio)cyanate compound, a poly(thio)epoxy compound, a polyoxetanyl compound, a polythietanyl compound, a poly(meth)acryloyl compound, a polyalkene compound, an alkyne compound, a poly(thi)ol compound, a polyamine compound, an acid anhydride, or a polycarboxylic acid compound.

More detailed description will be given of the polymerizable compound included in the composition of the present embodiment. It is possible to classify the polymerizable compounds described above into (Group A) and (Group B) depending on reactivity.

(Group A): It is possible to classify a polyiso(thio)cyanate compound, a poly(thio)epoxy compound, a polyoxetanyl compound, a polythietanyl compound, a poly(meth)acryloyl compound, a polyalkene compound, or an alkyne compound into (Group A) as a self-polymerizable or copolymerizable compound. However, the following (Group B) is not included in (Group A).

(Group B): It is possible to classify a poly(thi)ol compound, a polyamine compound, an acid anhydride, or a polycarboxylic acid compound into (Group B) as an addition polymerizable compound. However, (Group A) described above is not included in (Group B).

In a case where the polymerizable compound described above is used alone, any one type selected from (Group A) or (Group B) is selected. In a case where the polymerizable compound described above is used alone (one type), one type selected from the self-polymerizable or copolymerizable compound (Group A) is preferable because this type is more easily cured than one type selected from the addition polymerizable compounds (Group B).

In a case where two or more types of the polymerizable compounds described above are used, examples include a method for mixing two or more types selected only from (Group A), two or more types selected only from (Group B), or one or more types selected from (Group A) and one or more types selected from (Group B).

The polyiso(thio)cyanate compound classified as a self-polymerizable or copolymerizable compound tends to be lower in self-polymerizability or copolymerization reactivity with the (Group A) compounds than the other compounds classified in (Group A); however, if a condition is selected, a self-polymerization reaction type polymer such as a 1-nylon type polymer and an isocyanurate type polymer may be obtained. Furthermore, in the copolymerization with a poly (thio)epoxy compound, an ethylene carbonate type copolymer polymer may be obtained.

Although polymerization is generally difficult even with two or more types selected from the addition polymerizable (Group B) only, in a case where an acid anhydride and a poly(thi)ol compound are combined, a case where an acid anhydride and a polyamine compound are combined, or a case where three types of an acid anhydride, a poly(thi)ol compound and a polyamine compound are combined, the polymerization reaction tends to proceed easily and a cured resin tends to be obtained. The blending ratio of acid anhydride and poly(thi)ol or polyamine is, as the functional group molar ratio of the acid anhydride group of the acid anhydride/the mercapto group of the poly(thi)ol (or amino group of polyamine), in a range of approximately 8/2 to 2/8, preferably in the range of 6/4 to 4/6, and more preferably in the range of 55/45 to 45/55.

When the blending ratio in a case of using both (Group A) and (Group B) is represented by the functional group molar ratio of the polymerizable functional group of (Group A)/polymerizable functional group of (Group B), the mixing ratio is approximately in the range of 999/1 to 1/9, preferably in the range of 99/1 to 10/90, more preferably in the range of 9/1 to 3/7, and even more preferably in the range of 7/3 to 4/6.

In the present embodiment, from the viewpoint of improving the balance between an effect of increasing the pot life of the polymerizable composition, an effect of improving the transparency of the obtainable molded article, and an effect of suppressing striae in the molded article, as examples of combinations of the modifier and the polymerizable compound in the polymerizable composition, it is preferable that the modifier include components (A) and (B); it is more preferable that the modifier include components (A), (B), and (C);
the compounds represented by General Formulas (9) to (14) are even more preferably included;
the polymerizable compound is preferably one or two or more types of compounds selected from polyiso(thio)cyanate compounds, poly(thio)epoxy compounds, polyoxetanyl compounds, polythietanyl compounds, poly(meth)acryloyl compounds, polyalkene compounds, alkyne compounds, poly(thi)ol compounds, polyamine compounds, acid anhydrides, or polycarboxylic acid compounds; more preferably includes a polyiso(thio)cyanate compound;
even more preferably includes a polyiso(thio)cyanate compound and a poly(thi)ol compound;
and is yet more preferably a combination including a polyiso(thio)cyanate compound and a poly(thi)ol compound other than component (C).

In addition, in the present embodiment, a reactant of component (A) or (B), or, as appropriate, (C), with the polymerizable compound may be present in the polymerizable composition. In addition, a reactant of one or two or more compounds selected from the group consisting of component (A) and component (B), and, as appropriate, (C), with the polymerizable compound may be present in the polymerizable composition. Such a reactant may be an intermediate in a polymerization reaction.

In addition, when the polymerizable composition includes the reactant of component (A) or (B) or, as appropriate, (C), with the polymerizable compound, this reactant may be generated in the polymerizable composition, as with the intermediate described above, or may be prepared in advance and blended in the polymerizable composition. In the latter case, for example, after preparing a reactant of component (A), (B), or, as appropriate, (C) with the polymerizable compound, it is also possible for the obtained reactant to be mixed with another polymerizable compound to obtain a polymerizable composition.

In addition, when the polymerizable composition includes the reactant of one or two or more compounds selected from the group consisting of component (A) and component (B), and, as appropriate, (C), this reactant may be generated in the polymerizable composition as with the intermediate described above or may be prepared in advance and blended in the polymerizable composition.

For example, when the polymerizable compound includes a polyiso (thio) cyanate compound, one or two or more types of compounds selected from the compounds represented by General Formulas (15) to (17) may be present in the polymerizable composition.

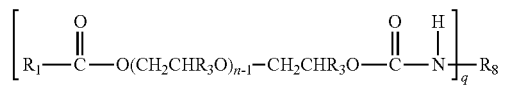

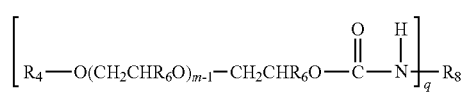

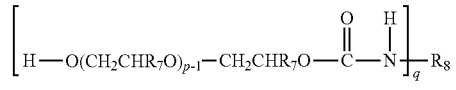

(In General Formulas (15) to (17), $R_1$, $R_3$, $R_4$, $R_6$, and $R_7$ are the same as $R_1$, $R_3$, $R_4$, $R_6$, and $R_7$ in General Formulas (1) to (5), $R_8$ is a residue derived from a polyiso(thio)cyanate compound, and q is an integer of 2 or more.)

[Other Components]

The composition of the present embodiment may include components other than the polymerizable compound. Examples thereof include a monofunctional iso(thio)cyanate compound, a monofunctional (thio)epoxy compound, a monofunctional oxetanyl compound, a monofunctional thietanyl compound, a monofunctional (meth)acryloyl compound having one functional group freely selected from a methacryloyloxy group, an acryloyloxy group, a methacryloylthio group, an acryloylthio group, a methacrylamide group, or an acrylamide group, a monofunctional alkene compound having one polymerizable carbon-carbon double bond other than a methacryloyloxy group, an acryloyloxy group, a methacryloylthio group, an acryloylthio group, a methacrylamide group, or an acrylamide group, a monofunctional alcohol compound other than alcohol used as a solvent, a monofunctional thiol compound, a monofunctional amine compound having one functional group freely selected from an amino group or a secondary amino group, a monofunctional carboxylic acid compound having one carboxyl group, a solvent, moisture, and the like. Here, components other than the polymerizable compound described above mean components other than component (A), component (B) and component (C). For example, the monofunctional alcohol compound described above is an alcohol compound other than component (A), component (B), and component (C).

However, when a large amount of residual solvent and moisture remain in the composition at the time of manufacturing the molded article of the present embodiment by cast polymerization, air bubbles are likely to occur during injection and polymerization curing and the air bubbles will be fixed (solidified) inside the molded article at the end, thus the solvent and water are preferably not included as much as possible in the composition including the polymerizable compound. Accordingly, the amount of the solvent and water included in the composition of the present embodiment immediately before injection into a cavity is preferably at least 20% by weight or less, more preferably 5% by weight or less, and even more preferably 1% by weight or less.

Examples of solvents highly likely to be included in the composition of the present embodiment include solvents mixed by various routes such as reaction solvents remaining in the internal release agent, reaction solvents remaining in the polymerizable compound, solvents added for from the viewpoint of lowering the viscosity of the composition, and solvents added for dissolving various additives from the viewpoint of improving operability.

Examples of types of solvents which are likely to remain include water such as moisture, alcohols such as methanol, ethanol, 1-propanol, isopropanol, 1-butanol, isobutanol, t-butanol, 1-pentanol, 2-pentanol, 3-pentanol, isopentanol, 1-hexanol, 2-ethylhexanol, 1-octanol, 2-methoxy ethanol, and 1-methoxy-2-propanol, ketones such as acetone, methyl ethyl ketone, methyl-n-propyl ketone, methyl isopropyl ketone, methyl-n-butyl ketone, methyl isobutyl ketone, and cyclohexanone, esters other than component (A) such as ethyl acetate, n-propyl acetate, isopropyl acetate, n-butyl acetate, and isobutyl acetate, carbonates such as diethyl carbonate, ethylene carbonate, and 1,2-propylene carbonate, ethers other than component (B) such as tetrahydrofuran, and dioxane, aliphatic hydrocarbons such as n-hexane, cyclohexane, and methylcyclohexane, aromatic hydrocarbons such as benzene, toluene, and xylene, nitrogen-containing compounds such as N,N-dimethylformamide, N,N-dimethylacetamide, n-methylpyrrolidone, and nitrobenzene, halogen-containing compounds such as dichloromethane, chloroform, dichloroethane, 1,1,2-trichloro-1,1,2-trifluoroethane, and 1,1,2,2-tetrachloro-1,2-difluoroethane, and the like.

In the process of cast polymerizing the composition of the present embodiment to manufacture a molded article, as necessary, a polymerization catalyst or a thermal polymerization initiator is added in a case of curing by heat, and a photopolymerization initiator is added in a case of curing by radiation other than with infrared (heat), such as ultraviolet rays.

Examples of polymerization catalysts include a Lewis acid, amines, tertiary amine compounds and inorganic acid salts or organic acid salts thereof, metal compounds, quaternary ammonium salts, organic sulfonic acids, and the like.

The usage amount of the polymerization catalyst with respect to the polymerizable composition is preferably in the range of 5 ppm to 15% by weight, more preferably in the range of 10 ppm to 10% by weight, and even more preferably in the range of 50 ppm to 3% by weight.

Examples of metal compounds used as polymerization catalysts include dimethyltin dichloride, dibutyltin dichloride, dibutyltin dilaurate, and the like.

In addition, examples of other polymerization catalysts include imidazole compounds. Specific examples of imidazole compounds include 2-methylimidazole, 2-ethylimidazole, 2-ethyl-4-methylimidazole, 1-cyanoethyl-2-phenylimidazole, 1-cyanoethyl-2-phenylimidazolium trimellitate, 2-phenylimidazole, 2-mercapto-1-methylimidazole, dimethylimidazole, N-benzylimidazole, 1-phenylimidazole, 1-(2-cyanoethyl)-2-ethyl-4-methylimidazole, 2-isopropylimidazole, 4-methylimidazole, benzylmethylimidazole, and imidazole.

Examples of the thermal polymerization initiator to be used include ketone peroxide compounds such as methyl isobutyl ketone peroxide and cyclohexanone peroxide; diacyl peroxide compounds such as isobutyryl peroxide, o-chlorobenzoyl peroxide, and benzoyl peroxide; dialkyl peroxide compounds such as tris(t-butylperoxy)triazine and t-butyl cumyl peroxide; peroxyketal compounds such as 1,1-di(t-hexylperoxy)cyclohexane, 2,2-bis(4,4-di-t-butylperoxycyclohexyl)propane, and 2,2-di(t-butylperoxy)butane; alkyl perester compounds such as α-cumyl peroxyneodecanoate, t-butyl peroxypivalate, 2,4,4-trimethylpentyl peroxy-2-ethyl hexanoate, t-butyl peroxy-2-ethyl hexanoate, and t-butyl peroxy-3,5,5-trimethyl hexanoate; peroxycarbonate compounds such as di-3-methoxybutyl peroxydicarbonate, bis(4-t-butylcyclohexyl)peroxydicarbonate, t-butylperoxy isopropyl carbonate, and diethylene glycol bis(t-butylperoxycarbonate); and the like.

Examples of the photopolymerization initiator to be used include a photoradical polymerization initiator, a photocationic polymerization initiator, a photoanionic polymerization initiator, and the like, and, among these photopolymerization initiators, a photoradical polymerization initiator is preferable.

Examples of photoradical polymerization initiators include Irgacure 127 (manufactured by BASF), Irgacure 651 (manufactured by BASF), Irgacure 184 (manufactured by BASF), Darocure 1173 (manufactured by BASF), benzophenone, 4-phenyl benzophenone, Irgacure 500 (manufactured by BASF), Irgacure 2959 (manufactured by BASF), Irgacure 907 (manufactured by BASF), Irgacure 369 (manufactured by BASF), Irgacure 1300 (manufactured by BASF), Irgacure 819 (manufactured by BASF), Irgacure 1800 (manufactured by BASF), Darocure TPO (manufactured by BASF), Darocure 4265 (manufactured by BASF), Irgacure OXE 01 (manufactured by BASF), Irgacure OXE 02 (manufactured by BASF), Esacure KT 55 (manufactured by Lamberti), Esacure ONE (manufactured by Lamberti), Esacure KIP 150 (manufactured by Lamberti), Esacure KIP 100 F (manufactured by Lamberti), Esacure KT 37 (manufactured by Lamberti), Esacure KTO 46 (manufactured by Lamberti), Esacure 1001M (manufactured by Lamberti), Esacure KIP/EM (manufactured by Lamberti), Esacure DP250 (manufactured by Lamberti), Esacure KB 1 (manufactured by Lamberti), 2,4-diethylthioxanthone, and the like.

Among these photoradical polymerization initiators, Irgacure 127 (manufactured by BASF), Irgacure 184 (manufactured by BASF), Darocure 1173 (manufactured by BASF), Irgacure 500 (manufactured by BASF), Irgacure 819 (manufactured by BASF), Darocure TPO (manufactured by BASF), Esacure ONE (manufactured by Lamberti), Esacure KIP 100 F (manufactured by Lamberti), Esacure KT 37 (manufactured by Lamberti), Esacure KTO 46 (manufactured by Lamberti), and the like are preferable.

Examples of photocationic polymerization initiators include Irgacure 250 (manufactured by BASF), Irgacure 784 (manufactured by BASF), Esacure 1064 (manufactured by Lamberti), Cyraure UVI 6990 (manufactured by Union Carbide Japan Ltd.), Adeka Optomer SP-172 (manufactured by ADEKA), Adeka Optomer SP-170 (manufactured by ADEKA), Adeka Optomer SP-152 (manufactured by ADEKA), and Adeka Optomer SP-150 (manufactured by ADEKA).

In a case where the photopolymerization initiator is used, a photopolymerization accelerator may be used in combination therewith. Examples of photopolymerization accelerators include 2,2-bis(2-chlorophenyl)-4,5'-tetraphenyl-2'H-<1,2'>biimidazolyl, tris(4-dimethylaminophenyl)methane, 4,4'-bis(dimethylamino)benzophenone, 2-ethylanthraquinone, camphorquinone, and the like.

The usage amount of the photopolymerization initiator and the thermal polymerization initiator with respect to the entire polymerizable composition is preferably in the range of 0.1 to 20% by weight, more preferably in the range of 0.5 to 10% by weight, and even more preferably in the range of 1 to 5% by weight.

In the process of cast polymerizing the composition of the present embodiment to manufacture a molded article, an internal release agent may be added as necessary.

As the internal release agent, it is possible to use an acidic phosphate ester. Examples of acidic phosphate esters include phosphoric monoesters and phosphoric acid diesters, which may be used alone or in a combination of two or more types.

It is possible to represent the acidic phosphate ester used as an internal release agent by General Formula (18).

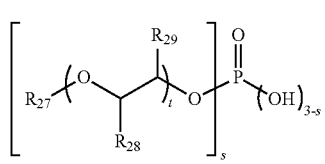

(18)

In General Formula (18), s represents an integer of 1 or 2, t represents an integer of 0 to 18, $R_{27}$ represents an alkyl group having 1 to 20 carbon atoms, $R_{28}$ and $R_{29}$ each independently represents a hydrogen atom, a methyl group, or an ethyl group. The number of carbon atoms in [ ]s is preferably 4 to 20. A plurality of present $R_{27}$, a plurality of present $R_{28}$, or a plurality of present $R_{29}$ may be the same or different from each other.

Examples of $R_{27}$ in General Formula (18) include organic residues derived from linear aliphatic compounds such as methane, ethane, propane, butane, pentane, hexane, heptane, octane, nonane, decane, undecane, dodecane, tetradecane, and hexadecane; organic residues derived from branched aliphatic compounds such as 2-methylpropane, 2-methylbutane, 2-methylpentane, 3-methylpentane, 3-ethylpentane, 2-methylhexane, 3-methylhexane, 3-ethylhexane, 2-methylheptane, 3-methylheptane, 4-methylheptane, 3-ethylheptane, 4-ethylheptane, 4-propylheptane, 2-methyloctane, 3-methyloctane, 4-methyloctane, 3-ethyloctane, 4-ethyloctane, and 4-propyloctane; organic residues derived from alicyclic compounds such as cyclopentane, cyclohexane, 1,2-dimethylcyclohexane, 1,3-dimethylcyclohexane, and 1,4-dimethylcyclohexane, and it is possible to use at least one type selected from the above. Note that an embodiment is not limited only to these exemplified compounds. It is possible to use at least one type or a mixture of two or more types of acidic phosphate esters.

In General Formula (18) described above, t is preferably 0 or 1.

In a case where t is 0, $R_{27}$ is preferably a linear or branched alkyl group having 4 to 12 carbon atoms, and more preferably a linear alkyl group having 4 to 12 carbon atoms.

In a case where t is 1, $R_{27}$ is preferably a linear or branched alkyl group having 1 to 20 carbon atoms, and is even more preferably a linear or branched alkyl group having 3 to 12 carbon atoms.

It is possible to use the acidic phosphate ester as one type or a mixture of two or more types selected from the above.

Examples of acidic phosphate esters include ZelecUN (manufactured by STEPAN), internal release agents for MR (manufactured by Mitsui Chemicals, Inc.), the JP series such as JP-506H manufactured by Johoku Chemical Co., Ltd., the phosphanol series manufactured by Toho Chemical Industry Co., Ltd., the AP and DP series manufactured by Daihachi Chemical Industry Co., Ltd., and more preferable are ZelecUN (manufactured by STEPAN Co.), and internal release agents for MR (manufactured by Mitsui Chemicals, Inc.).

In order to prevent the molded article formed of the cured resin of the present embodiment from deteriorating even when exposed to the outside for a long period of time, it is desirable to further add an ultraviolet absorber and a hindered amine light stabilizer to the composition of the present embodiment and have a composition imparted with weatherability.

The ultraviolet absorber described above is not limited, and, for example, it is possible to use various ultraviolet absorbers such as a benzotriazole-based ultraviolet absorber, a triazine-based ultraviolet absorber, a benzophenone-based ultraviolet absorber, a benzoate-based ultraviolet absorber, a propanedioic acid ester-based ultraviolet absorber, or an oxanilide-based ultraviolet absorber.

Specifically, ultraviolet absorbers include benzotriazole-based ultraviolet absorbers such as 2-(2H-benzotriazol-2-yl)-4-methyl-6-(3,4,5,6-tetrahydrophthalimidylmethyl) phenol, 2-(2H-benzotriazole-2-yl)-p-cresol, 2-(2H-benzotriazole-2-yl)-4-tert-butylphenol, 2-(2H-benzotriazole-2-yl)-4,6-di-tert-butylphenol, 2-(2H-benzotriazole-2-yl)-4,6-bis(1-methyl-1-phenyl ethyl)phenol, 2-(2H-benzotriazole-2-yl)-4-(1,1,3,3-tetramethylbutyl)-6-(1-methyl-1-phenyl ethyl)phenol, 2-(2H-benzotriazole-2-yl)-4-(3-on-4-oxa-dodecyl)-6-tert-butyl-phenol, 2-{5-chloro(2H)-benzotriazole-2-yl}-4-(3-on-4-oxa-dodecyl)-6-tert-butyl-phenol, 2-{5-chloro(2H)-benzotriazole-2-yl}-4-methyl-6-tert-butyl-phenol, 2-(2H-benzotriazole-2-yl)-4,6-di-tert-pentylphenol, 2-{5-chloro(2H)-benzotriazole-2-yl}-4,6-di-tert-butylphenol, 2-(2H-benzotriazole-2-yl)-4-tert-octylphenol, 2-(2H-benzotriazole-2-yl)-4-methyl-6-n-dodecyl phenol, 3-[3-tert-butyl-5-(5-chloro-2H-benzotriazole-2-yl)-4-hydroxyphenyl]octyl propionic acid, 3-[3-tert-butyl-5-(5-chloro-2H-benzotriazole-2-yl)-4-hydroxyphenyl]propionic acid 2-ethylhexyl, reaction product of methyl-3-{3-(2H-benzotriazole-2-yl)-5-tert-butyl-4-hydroxy-phenyl}propionate/polyethylene glycol 300, trade name Viosorb 583 (manufactured by Kyodo Chemical Co., Ltd.), trade name Tinuvin 326 (manufactured by BASF), trade name Tinuvin 384-2 (manufactured by BASF), trade name Tinuvin PS (manufactured by BASF), trade name Seesorb 706 (manufactured by Shipro Kasei Kaisha, Ltd.), and trade name Eversorb 109 (manufactured by Everlight Chemical Industrial Corp.); triazine-based ultraviolet absorbers such as 2-(4-phenoxy-2-hydroxy-phenyl)-4,6-diphenyl-1,3,5-triazine, 2-(2-hydroxy-4-oxa-hexadecyloxy)-4,6-di(2,4-dimethyl-phenyl)-1,3,5-triazine, 2-(2-hydroxy-4-oxa-heputadecyloxy)-4,6-di(2,4-dimethyl-phenyl)-1,3,5-triazine, 2-(2-hydroxy-4-iso-octyloxy-phenyl)-4,6-di(2,4-dimethyl-phenyl)-1,3,5-triazine, trade name Tinuvin 400 (manufactured by BASF), trade name Tinuvin 405 (manufactured by BASF), trade name Tinuvin 460 (manufactured by BASF), and trade name Tinuvin 479 (manufactured by BASF); benzophenone-based ultraviolet absorbers such as 2-hydroxy-4-n-methoxybenzophenone and 2-hydroxy-4-n-octoxybenzophenone; benzoate-based ultraviolet absorbers such as 2,4-di-tert-butyl phenyl-3,5-di-tert-butyl-4-hydroxy benzoate; propanedioccitan acid ester-based ultraviolet absorbers such as propanedioccitan acid-{(4-methoxyphenyl)-methylene}-dimethyl ester, trade name Hostavin PR-25 (manufactured by Clariant Japan Co., Ltd.), and trade name Hostavin B-CAP (manufactured by Clariant Japan Co., Ltd.); oxanilide-based ultraviolet absorbers such as 2-ethyl-2'-ethoxy-oxanilide, trade name Sanduvor VSU (manufactured by Clariant Japan Co., Ltd.); and the like. Among these ultraviolet absorbers, benzotriazole and triazine-based ultraviolet absorbers tend to be preferable.

The hindered amine light stabilizers (abbreviated to HALS) described above are not limited; however, in general, there are many cases where hindered amine light stabilizers are expressed as a generic name of compounds having a 2,2,6,6-tetramethylpiperidine skeleton and these are broadly classified into low molecular weight HALS, medium molecular weight HALS, high molecular weight HALS, and reactive type HALS depending on the molecular weight.

Specific examples of hindered amine light stabilizers include trade name Tinuvin 111 FDL (manufactured by BASF), bis(1-octyloxy-2,2,6,6-tetramethyl-4-piperidyl)sebacate (trade name Tinuvin 123 (manufactured by BASF)), trade name Tinuvin 144 (manufactured by BASF), trade name Tinuvin 292 (manufactured by BASF), trade name Tinuvin 765 (manufactured by BASF), trade name Tinuvin 770 (manufactured by BASF), N,N'-bis(3-aminopropyl)ethylenediamine-2,4-bis[N-butyl-N-(1,2,2,6,6-pentamethyl-4-piperidyl)amino]-6-chloro-1,3,5-triazine condensate (trade name CHIMASSORB 119 FL (manufactured by BASF)), trade name CHIMASSORB 2020 FDL (manufactured by BASF), dimethyl succinate-1-(2-hydroxyethyl)-4-hydroxy-2,2,6,6-tetramethylpiperidine polycondensate (trade name CHIMASSORB 622 LD (manufactured by BASF)), poly[{6-(1,1,3,3-tetramethyl-butyl)amino-1,3,5-triazin-2,4-diyl}{(2,2,6,6-tetramethyl-4-piperidyl)imino}hexame-thylene {(2,2,6,6-tetramethyllauryl-4-piperidyl)imino}] (trade name CHIMASSORB 944 FD (manufactured by BASF)), trade name Sanduvor 3050 Liq. (manufactured by Clariant Japan Co., Ltd.), trade name Sanduvor 3052 Liq. (manufactured by Clariant Japan Co., Ltd.), trade name Sanduvor 3058 Liq. (manufactured by Clariant Japan Co., Ltd.), trade name Sanduvor 3051 Powder (manufactured by Clariant Japan Co., Ltd.), trade name Sanduvor 3070 Powder (manufactured by Clariant Japan Co., Ltd.), trade name VP Sanduvor PR-31 (manufactured by Clariant Japan Co., Ltd.), trade name Hostavin N 20 (manufactured by Clariant Japan Co., Ltd.), trade name Hostavin N 24 (manufactured by Clariant Japan Co., Ltd.), trade name Hostavin N 30 (manufactured by Clariant Japan Co., Ltd.), trade name Hostavin N 321 (manufactured by Clariant Japan Co., Ltd.), trade name Hostavin PR-31 (manufactured by Clariant Japan Co., Ltd.), trade name Hostavin 845 (manufactured by Clariant Japan Co., Ltd.), trade name NYLO STAB S-EED (manufactured by Clariant Japan Co., Ltd.), and the like.

The addition amount of the ultraviolet absorber and the hindered amine light stabilizer is not limited; however, with respect to the entire polymerizable composition, the ultraviolet absorber is usually an amount of 0.1 to 20% by weight, and preferably 0.5 to 10% by weight, while the content of the hindered amine light stabilizer is usually in the range of 0.1 to 10% by weight, preferably 0.5 to 5% by weight, and more preferably 1 to 3% by weight. In a case where the addition amounts of the ultraviolet absorber and the hindered amine light stabilizer are within the ranges described above, the effect of improving the weather resistance of the cured resin obtainable by polymerizing the composition of the present embodiment and the molded article formed of the resin is increased. In a case where the addition amounts of the ultraviolet absorber and the hindered amine light stabilizer are excessively small, the effect of improving the weather resistance of the obtainable molded article may be reduced in some cases. On the other hand, in a case where the addition amounts of the ultraviolet absorbers and the hindered amine light stabilizers are excessively large, the addition amounts may be insufficient when the composition including the polymerizable compound is polymerized with radiation such as W.

Further, a light control dye or a light control coloring agent may be added from the viewpoint of imparting light control properties. It is possible to use one or two or more types from representative light-control dyes or light-control coloring agents from spiropyran-based compounds, spirooxazine-based compounds, fulgide-based compounds, naphthopyran-based compounds, and bisimidazole compounds, according to the desired coloration.

Among the above, examples of spiropyran-based compounds include substituents in which the indole ring and benzene ring of indolinospirobenzopyran are substituted with a halogen, methyl, ethyl, methylene, ethylene, a hydroxyl group, or the like, substituents in which the indole ring and naphthalene ring of indolinospiro naphthopyran are substituted with a halogen, methyl, ethyl, methylene, ethylene, a hydroxyl group, or the like, substituents in which the indole ring of indolinospiroquinolinopyran is substituted with a halogen, methyl, ethyl, methylene, ethylene, a hydroxyl group or the like, substituents in which the indole ring of indolinospiropyridopyran is substituted with a halogen, methyl, ethyl, methylene, ethylene, a hydroxyl group, or the like, and the like.

Examples of spirooxazine-based compounds include substituents in which an indole ring and a benzene ring of indolinospirobenzoxazine are substituted with halogen, methyl, ethyl, methylene, ethylene, a hydroxyl group, or the like, substituents in which the indole ring and naphthalene ring of indolinospironaphthoxazine are substituted with a halogen, methyl, ethyl, methylene, ethylene, a hydroxyl group, or the like, substituents in which the indole ring of indolinospirophenanthoxazine is substituted with a halogen, methyl, ethyl, methylene, ethylene, a hydroxyl group, or the like, substituents in which an indole ring of indolinospiroquinolino oxazine is substituted with a halogen, methyl, ethyl, methylene, ethylene, a hydroxyl group, or the like, substituents in which a piperidine ring and a naphthalene ring of piperidinospiro naphthoxazine are substituted with a halogen, methyl, ethyl, methylene, ethylene, a hydroxyl group, or the like, and the like.

Examples of fulgide-based compounds include N-cyanomethyl-6,7-dihydro-4-methyl-2-phenylspiro(5,6-benzo[b]thiophenedicarboximido-7,2'-tricyclo[3.3.1.1$^{3,7}$]decane], N-cyanomethyl-6,7-dihydro-2-(p-methoxyphenyl)-4-methylspiro (5,6-benzo[b]thiophenedicarboximide-7,2'-tricyclo [3.3.1.1$^{3,7}$]decane), 6,7-dihydro-N-methoxycarbonylmethyl-4-methyl-2-phenylspiro(5,6-benzo[b]thiophenedicarboximide-7,2'-tricyclo[3.3.1.1$^{3,7}$]decane), 6,7-dihydro-4-methyl-2-(p-methylphenyl)-N-nitromethylspiro(5,6-benzo [b]thiophene dicarboximide-7,2'-tricyclo[3.3.1.1$^{3,7}$]decane), N-cyanomethyl-6,7-dihydro-4-cyclopropyl-3-methylspiro (5,6-benzo[b]thiophenedicarboximide-7,2'-tricyclo [3.3.1.1$^{3,7}$]deca ne), N-cyanomethyl-6,7-dihydro-4-cyclopropylspiro(5,6-benzo[b]thiophenedicarboximide-7,2'-tricyclo[3.3.1.1$^{3,7}$]deca ne), N-cyanomethyl-6,7-dihydro-2-(p-methoxyphenyl)-4-cyclopropyl Spiro(5,6-benzo[b]thiophenedicarboximido-7,2'-tricyclo[3.3.1.1$^{3,7}$]deca ne), and the like.

Examples of naphthopyran-based compounds include spiro[norbornane-2,2'-[2H]benzo[h]chromene], spiro[bicyclo[3.3.1]nonane-9,2'-[2H]benzo[h]chromene], 7'-methoxyspiro[bicyclo[3.3.1]nonane-9,2'-[2H]benzo[h]chromene], 7'-methoxyspi[norbornane-2,2'-[2H]benzo[f]chromene], 2,2-dimethyl-7-octoxy[2H]benzo[h]chromene, spiro[2-bicyclo[3.3.1]nonene-9,2'-[2H]benzo[h]chromene], spiro[2- bicyclo[3.3.1]nonene-9,2'-[2H]benzo[f]chromene], 6-morpholino-3,3-bis(3-fluoro-4-methoxyphenyl)-3H-benzo (f) chromene, 5-isopropyl-2,2-diphenyl-2H-benzo (h) chromene, and the like.

The addition amounts of these light control dyes or light control coloring agents are not limited, but are in the range of approximately 0.01 to 10000 ppm (by weight) with respect to the entire polymerizable composition, preferably 0.1 to 1000 ppm (by weight), and more preferably in the range of 1 to 100 ppm (by weight).

The composition of the present embodiment may further contain, as necessary, various additives such as a polymerization accelerator, a catalyst, an infrared absorber, a radical scavenger, an antioxidant, a polymerization inhibitor, a non-light control coloring agent and dye, a color tone adjusting agent such as a bluing agent, a binder, a dispersant, an antifoaming agent, and nanometer-sized organic or inorganic particles.

Examples of color tone adjusting agents such as a bluing agent include agents having an absorption band in the orange to yellow wavelength range of the visible light region and having a function of adjusting the hue of an optical material formed of a resin. More specifically, a bluing agent includes a substance exhibiting a blue to purple color.

As a color tone adjusting agent such as a bluing agent, for example, it is possible to use the Plast Color series manufactured by Arimoto Chemical Co., Ltd.

In the present embodiment, since the polymerizable composition includes component (A) or (B), it is possible to effectively reduce striae caused by convection or the like generated inside a cavity during polymerization. In addition, the polymerizable composition including one or more compounds selected from the group consisting of component (A) and component (B) and the polymerizable compound makes it possible to effectively reduce striae caused by convection or the like generated inside a cavity during polymerization.

In addition, even in a case where thickening occurs in the polymerizable composition of the present embodiment after time elapses from preparation, it is also possible to remarkably reduce the striae of the obtainable optical lens, and it is also possible to greatly improve a product yield. Furthermore, the obtainable optical lens is also excellent in quality, such as in the optical properties thereof.

In this manner, according to the present embodiment, using component (A) or (B) makes it possible to obtain a polymerizable composition having a longer pot life than in the related art without impairing the safety and productivity during polymerization, and to stably manufacture extremely high-quality products excellent in an appearance and physical properties. In addition, in the present embodiment, the effect described above is obtained due to the polymerizable composition including one or two or more compounds selected from the group consisting of component (A) and component (B), and a polymerizable compound.

In addition, according to the present embodiment, for example, it is also possible to obtain an optical lens in which striae are effectively suppressed and is excellent in optical properties such as refractive index and Abbe number, and heat resistance.

<Cured Resin and Molded Article>

A cured resin obtainable by thermally polymerizing (curing) the composition of the present embodiment and a molded article formed of the resin are manufactured by adding a polymerizable compound thereto along with various additives and the like as described above as necessary. In addition, polymerizable compounds, additives, and the like not described in this application may be added to the composition of the present embodiment within a range not impairing the effect of the present embodiment.

The cured resin forming the molded article of the present embodiment is preferably a cured resin obtainable from a liquid polymerizable composition with which it is easy to carryout a casting operation and, among such cured resins, the cured resins in (a) to (z) are preferable.

(a) A poly(thio)urethane resin obtained by polymerizing a polyiso(thio)cyanate compound and a poly(thi)ol compound In the present application, poly(thio)urethane resin means a polyurethane resin, a polythiourethane resin, or a polydithiourethane resin.

(b) A poly(thio)urea resin obtained by polymerizing a polyisocyanate compound or a polyisothiocyanate compound and a polyamine compound In the present application, poly(thio)urea resin means a polyurea resin or a polythiourea resin.

(c) A poly(thio)epoxy resin obtained by polymerizing a poly(thio)epoxy compound (d) A poly(thio)epoxy-poly(thi)ol resin obtained by polymerizing a poly(thio)epoxy compound and a poly(thi)ol compound (e) A poly(thio)epoxy-polyamine resin obtained by polymerizing a poly(thio)epoxy compound and a polyamine compound (f) A poly(thio)epoxy-acid anhydride resin obtained by polymerizing a poly(thio)epoxy compound and an acid anhydride (g) A poly(meth)acryloyl resin obtained by polymerizing a poly(meth)acryloyl compound (h) A poly(meth)acryloyl-poly(thi)ol resin obtained by polymerizing a poly(meth)acryloyl compound and a poly(thi)ol compound (i) A poly(meth)acryl-polyalkene resin obtained by polymerizing a poly(meth)acryloyl compound and a polyalkene compound (j) A poly(meth)acryl-polyalkyne resin obtained by polymerizing a poly(meth)acryloyl compound and an alkyne compound (k) A poly(meth)acryl-polyamine resin obtained by polymerizing a poly(meth)acryloyl compound and a polyamine compound (l) A polyalkene resin obtained by polymerizing a polyalkene compound (m) A polyalkene-poly(thi)ol resin obtained by polymerizing a polyalkene compound and a poly(thi)ol compound (n) A polyalkene-polyamine resin obtained by polymerizing a polyalkene compound and a polyamine compound (o) A polyalkyne resin obtained by polymerizing an alkyne compound (p) A polyalkyne-poly(thi)ol resin obtained by polymerizing an alkyne compound and a poly(thi)ol compound (q) A polyalkyne-polyamine resin obtained by polymerizing an alkyne compound and a polyamine compound (r) A polyalkyne-polyalkene resin obtained by polymerizing an alkyne compound and a polyalkene compound (s) A polyoxetanyl resin obtained by polymerizing a polyoxetanyl compound (t) A polyoxetanyl-poly(thi)ol resin obtained by polymerizing a polyoxetanyl compound and a poly(thi)ol compound (u) A polyoxetanyl-polyamine resin obtained by polymerizing a polyoxetanyl compound and a polyamine compound (v) A polyoxetanyl-acid anhydride resin obtained by polymerizing a polyoxetanyl compound and an acid anhydride (w) A polythietanyl-poly(thi)ol resin obtained by polymerizing a polythietanyl compound and a poly(thi)ol compound (x) A polythietanyl-polyamine resin obtained by polymerizing a polythietanyl compound and a polyamine compound (y) A polythietanyl-acid anhydride resin obtained by polymerizing a polythietanyl compound and an acid anhydride (z) A mixed resin obtained by copolymerizing two or more types selected from (a) to (y)

Among the curable resins (a) to (z) described above, examples of more preferable cured resins include the resins described in (a) to (i) and (s) to (z) and mixed resins thereof (a mixture or a copolymer or resins) and examples of even more preferable cured resins include the cured resins described in (a) to (f), (s) to (v), and (z) and mixed resins thereof.

<Optical Material>

In the present embodiment, it is possible to obtain molded articles of various shapes and optical materials formed of the molded articles by changing the mold during polymerization. It is possible to use the molded article of the present embodiment as various optical materials by forming the molded article into a desired shape and providing a coating layer or other member formed as necessary.

In addition, the method for manufacturing an optical material in the present embodiment includes, for example, a step of cast polymerizing the polymerizable composition of the present embodiment.

Examples of the optical material include a plastic lens, a light emitting diode (LED), a prism, an optical fiber, an information recording substrate, a filter, a light emitting diode, and the like. The optical material is especially suitable as a plastic lens.

Below, description will be given of a plastic lens formed of the molded article of the present embodiment. It is possible to manufacture the plastic lens as follows.

<Method for Manufacturing Plastic Lens>

The plastic lens of the present embodiment is usually manufactured by a cast polymerization method using the composition described above.

Specifically, first, component (A) or (B) and, as appropriate, (C) are added to a composition which includes a polymerizable compound, mixed and stirred, and subjected to defoaming under reduced pressure as necessary. In addition, one or two or more compounds selected from the group consisting of components (A) and (B), and, as appropriate, (C) may be added to the composition including the polymerizable compound, mixed and stirred, and subjected to defoaming under reduced pressure as necessary.

For example, in a case of manufacturing a poly(thio) urethane resin from a polyiso(thio)cyanate compound and a poly(thi)ol compound, the solubility of components (A) to (C) with respect to the poly(thi)ol compound may be low, thus a method in which the poly(thi)ol compound is mixed in after completely dissolving components (A) or (B), and, as appropriate, (C) in the polyiso(thio)cyanate compound in advance is preferable. In addition, a method is preferable in which one or two or more compounds selected from the group consisting of component (A) and component (B), and, as appropriate, (C) are completely dissolved in advance in the polyiso (thio) cyanate compound, and then the poly(thi) ol compound is mixed therewith.

The obtained composition of the present embodiment is injected into a cavity made of a glass mold and a gasket or a tape and heated or irradiated with radiation such as ultraviolet rays other than infrared rays to polymerize and cure the composition, so as to manufacture the cured resin of the present embodiment and a plastic lens formed of this resin.

In a case of manufacturing the cured resin of the present embodiment and the plastic lens formed of this resin by heating, from the viewpoint of preventing polymerization unevenness (striae) due to convection, the heating is usually carried out by gradually heating from a low temperature so as to carry out the polymerization over several days. Examples of typical heating conditions include gradually increasing from a low temperature in the range of 0° C. to 200° C. for 64 hours, similarly in the range of 5° C. to 150° C. for 40 hours, and similarly in the range of 20° C. to 120° C. for 36 hours.

Likewise, in a case of polymerization by radiation such as UV, in order to prevent polymerization unevenness (striae) due to convection, the irradiation of the radiation is usually carried out in parts or an irradiation intensity is lowered to gradually carry out polymerization. From the viewpoint of further preventing convection from occurring, a dual cure method or the like may be employed in which a uniform polymerizable reaction composition is injected into a cavity and then cooled once to form a state where convection does not easily occur, and a semi-cured composition formed in a uniform gel state by being irradiated with weak radiation is completely cured by heating.

The plastic lens obtained by releasing from the mold may be subjected to a reheat treatment (annealing) as necessary from the viewpoint of completing polymerization or removing distortion due to residual stress, or the like. Usually, a heat treatment is carried out at a temperature of Tg to Tg×2 times the obtained plastic lens in the range of 1 to 24 hours. Heat treatment conditions of a temperature of Tg to Tg×1.5 times for 1 to 16 hours are more preferable and heat treatment conditions of a temperature of Tg to Tg×1.2 times for 1 to 4 hours are even more preferable.

In a case of manufacturing the cured resin of the present embodiment and a plastic lens made of the resin using radiation, energy rays having a wavelength region in the range of 0.0001 to 800 nm are usually used as the radiation to be used. The radiation is classified into α rays, β, rays, γ rays, X-rays, electron rays, ultraviolet rays, visible rays, and the like and it is possible to appropriately select and use the radiation according to a composition of the mixture. Among these types of radiation, ultraviolet rays are preferable, and an output peak of ultraviolet rays is preferably in the range of 200 to 450 nm, more preferably in the range of 230 to 445 nm, even more preferably in the range of 240 to 430 nm, and yet more preferably in the range of 250 to 400 nm. By using ultraviolet rays within the range of the output peak described above, there are few problems such as yellowing and thermal deformation during polymerization and, even when an ultraviolet absorber is added, it is possible to complete the polymerization in a relatively short time.

In addition, in a case where an ultraviolet absorber and a hindered amine stabilizer are added to the composition described above, it is preferable to use ultraviolet rays having an energy output peak of ultraviolet rays in the range of 250 to 280 nm or 370 to 430 nm.

In this manner, the obtained cured resin of the present embodiment and the plastic lens formed of the resin may be provided with a functional coating layer such as a hard coat, an antireflection coat, a dimming coat, a coat imparting a slipping property or a treatment imparting a slipping property, or an electrostatic prevention coat on the surface of the resin or the plastic lens, and may be subjected to a dyeing treatment for imparting fashionability, a treatment such as surface and edge polishing, or a process for imparting various types of functionality by placing a polarizing film therein or attaching a polarizing film to the surface from the viewpoint of imparting a polarizing property thereto, and the like.

Furthermore, from the viewpoint of improving an adhesion between the functional coating layer and a base material, it is also possible for the surface of the obtained cured resin of the present embodiment and the plastic lens formed of the resin to be subjected to a corona treatment, an ozone treatment, a low-temperature plasma treatment using an oxygen gas or a nitrogen gas, a glow discharge treatment, an oxidation treatment using chemicals or the like, a physical or chemical treatment such as a flame treatment.

In addition, instead of these treatments or in addition to these treatments, a primer layer formed by a primer treatment, an undercoat treatment, an anchor coat treatment, or the like may be provided between the surface of the cured resin of the present embodiment and the plastic lens formed of the resin and the outermost layer (atmosphere-contacting surface) formed by the physical or chemical treatments described above.

As the coating agent used for the primer layer described above, for example, it is possible to use a coating agent having a main component of a vehicle of a resin such as a polyester resin, a polyamide resin, a polyurethane resin, an epoxy resin, a phenol resin, a (meth)acrylic resin, a polyvinyl acetate resin, polyolefin resins such as polyethylene and polypropylene, copolymers or modified resins thereof, and cellulose resins. The coating agent may be either a solvent type coating agent or an aqueous type coating agent.

Among these coating agents, preferable examples include modified polyolefin-based coating agents, ethyl vinyl alcohol-based coating agents, polyethylene imine-based coating agents, polybutadiene-based coating agents, and polyurethane-based coating agents;
polyester-based polyurethane emulsion coating agents, polyvinyl chloride emulsion coating agents, urethane acrylic emulsion coating agents, silicone acrylic emulsion coating agents, vinyl acetate acrylic emulsion coating agents, and acrylic emulsion coating agents; styrene-butadiene copolymer latex coating agents, acrylonitrile-butadiene copolymer latex coating agents, a methyl methacrylate-butadiene copolymer latex coating agents, chloroprene latex coating agents, rubber-based latex coating agents of polybutadiene latex, polyacrylic acid ester latex coating agents, polyvinylidene chloride latex coating agents, polybutadiene latex coating agents, or coating agents formed of a carboxylic acid modified latex or dispersion of a resin included in these latex coating agents.

It is possible to coat these coating agents using for example, a dip coating method, a spin coating method, a spray coating method, and the like and the coating amount on the base material is usually 0.05 g/m² to 10 g/m² in a dry state.

Among these coating agents, a polyurethane coating agent is more preferable. The polyurethane-based coating agent has urethane bonds in the main chain or side chain of the resin included in the coating agent. The polyurethane coating agent is, for example, a coating agent which includes a polyurethane obtainable by reacting a polyol such as a polyester polyol, a polyether polyol, or an acrylic polyol with an isocyanate compound.

Among these polyurethane-based coating agents, a polyurethane-based coating agent obtainable by mixing a polyester polyol such as a condensation type polyester polyol and a lactone-based polyester polyol with an isocyanate compound such as tolylene diisocyanate, hexamethylene diisocyanate, or xylene diisocyanate is preferable due to having excellent adhesion.

The method of mixing the polyol compound and the isocyanate compound is not limited. The blending ratio is also not limited; however, if the amount of the isocyanate compound is excessively small, curing failure may occur, thus the OH group of the polyol compound and the NCO group of the isocyanate compound are preferably in the range of 2/1 to 1/40 in terms of equivalent amounts.

The cured resin of the present embodiment may be applied to applications other than plastic lenses and examples other than plastic lenses include sheets and films and the like manufactured in the same manner as the plastic lens using a flat mold. The surface of a sheet or a film or the like formed of the cured resin of the present embodiment may be physically or chemically treated in the same manner as the plastic lens or the primer layer and the primer layer and a functional outermost layer (atmospheric contact surface) formed by a physical or chemical treatment or the like may be laminated thereon.

The plastic lens formed of the cured resin of the present embodiment may be a laminate including the primer layer described above between the functional outermost layer (atmospheric contact surface) formed by the above physical or chemical treatment and the like and the cured resin surface.

It is possible to use the obtained plastic lens of the present embodiment for various lens applications such as eyeglass lenses, camera lenses, pickup lenses, Fresnel lenses, prism lenses, and lenticular lenses. Among these, examples of further preferable applications are eyeglass lenses, camera lenses, and pickup lenses, with smooth surfaces.

It is possible to use the sheet and film of the present embodiment obtained in the same manner as various planar member applications requiring high transparency such as display members such as a flat panel or a smartphone panel, film members such as a scattering prevention film, a specific wavelength cut film, or a decorating film, and glass substitute members such as a building material window glass, a vehicle window glass, or mirrors.

The present invention includes the following aspects.

1. A polymerizable composition for an optical material, including components (A) or (B), and a polymerizable compound.

(A) an ester compound represented by General Formula (1)

(in General Formula (1), $R_1$ represents a hydrogen atom, a linear alkyl group having 1 to 20 carbon atoms, a branched alkyl group having 3 to 20 carbon atoms, a linear hydrocarbon group having 2 to 20 carbon atoms and having one or more unsaturated bonds, or a branched hydrocarbon group having 3 to 20 carbon atoms and having one or more unsaturated bonds, and $R_2$ represents a polyoxyalkylene group represented by General Formula (2))

$$—(CH_2CHR_3O)_nH \qquad (2)$$

(in General Formula (2), a plurality of present $R_3$ may be the same or different and each $R_3$ represents a hydrogen atom or a methyl group, and n represents an integer of 2 to 20)

(B) an ether compound represented by General Formula (3)

$$R_4—O—R_5 \quad (3)$$

(in General Formula (3), $R_4$ represents a linear alkyl group having 1 to 20 carbon atoms, a branched alkyl group having 3 to 20 carbon atoms, a linear hydrocarbon group having 2 to 20 carbon atoms and having one or more unsaturated bonds, or a branched hydrocarbon group having 3 to 20 carbon atoms and having one or more unsaturated bonds, and $R_5$ represents a linear alkyl group having 1 to 20 carbon atoms, a branched alkyl group having 3 to 20 carbon atoms, or a (poly)oxyalkylene group represented by General Formula (4))

$$—(CH_2CHR_6O)_mH \quad (4)$$

(in General Formula (4), a plurality of present $R_6$ may be the same or different and each $R_6$ represents a hydrogen atom or a methyl group, and m represents an integer of 1 to 20)

2. The polymerizable composition for an optical material according to the above 1., further including component (C).

(C) (poly)alkylene glycol represented by General Formula (5)

$$HO(CH_2CHR_7O)_pH \quad (5)$$

(in General Formula (5), a plurality of present $R_7$ may be the same or different and each $R_7$ represents a hydrogen atom or a methyl group, and p represents an integer of 1 to 20)

3. The polymerizable composition for an optical material according to the above 2., in which a total weight of components (A), (B) and (C) in the polymerizable composition for an optical material is 0.01 to 7.5% by weight with respect to 100% by weight of the polymerizable composition for an optical material.

4. The polymerizable composition for an optical material according to the above 2. or 3., in which component (C) is included in a range of 0.01 to 1% by weight in 100% by weight of the polymerizable composition for an optical material.

5. The polymerizable composition for an optical material according to any one of the above 1. to 4., in which the polymerizable compound is one or two or more types of compounds selected from a polyiso(thio)cyanate compounds, a poly(thio)epoxy compound, a polyoxetanyl compound, a polythietanyl compound, a poly(meth)acryloyl compound, a polyalkene compound, an alkyne compound, a poly(thi)ol compound, a polyamine compound, an acid anhydride, or a polycarboxylic acid compound.

6. A molded article obtained by curing the polymerizable composition for an optical material according to any one of the above 1. to 5.

7. An optical material including the molded article according to the above 6.

8. A plastic lens including the optical material according to the above 7.

9. A method for manufacturing an optical material, including cast polymerizing the polymerizable composition for an optical material according to any one of the above 1. to 5.

EXAMPLES

Specific description will be given below of the present invention based on Examples, but the present invention is not limited to these Examples. Evaluation of the molded articles and the plastic lenses formed of the cured resin was carried out by the following methods.

Striae: Lenses were manufactured using polymerizable compositions immediately after preparation and polymerizable compositions 2 hours after preparation, each lens was used for projection with an ultrahigh pressure mercury lamp (light source model OPM-252 HEG: manufactured by Ushio Inc.), and the transmitted image was visually evaluated for the presence or absence of striae. In the present example, these lenses are sequentially referred to as a lens immediately after preparation, and a lens after 2 hours.

Refractive index and Abbe number: Measurement was carried out at 20° C. using a refractometer KPR-20 (manufactured by Kalnew Optical Industries, Ltd.).

Heat Resistance (Glass Transition Temperature: Tg): Measured with a thermomechanical analyzer TMA-60 manufactured by Shimadzu Corporation using the TMA penetration method (50 g load, pin tip 0.5 mmϕ, heating rate 10° C./min).

Appearance: The turbidity of the created lens was visually confirmed in a dark room, "x" denotes that turbidity was confirmed and "○" denotes that turbidity was not confirmed.

In addition, the modifiers used in the following Examples are mixtures which contain 3% by weight of a compound represented by Formula (9), 44% by weight of a compound represented by Formula (10), 3% by weight of a compound represented by Formula (11), 9% by weight of a compound represented by Formula (12), 8% by weight of a compound represented by Formula (13), 32% by weight of a compound represented by Formula (14), in which the total weight of the compounds represented by Formulas (9) to (14) is 99%.

(9)

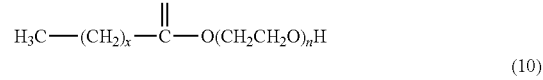

(10)

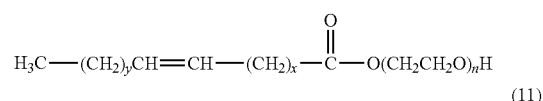

(11)

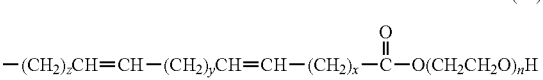

(12)

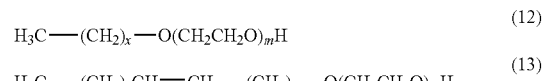

(13)

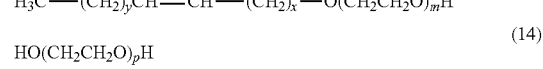

(14)

Here, the compound represented by Formula (9) is a compound in which x=12 and n=3 to 15, and a compound in which x=14 and n=2 to 16.

The compound represented by Formula (10) is a compound in which x+y=12 and n=2 to 16 and a compound in which x+y=14 and n=2 to 17.

The compound represented by Formula (11) is a compound in which x+y+z=12 and n=2 to 15.

The compound represented by Formula (12) is a compound in which x=15 and m=2 to 17, and a compound in which x=17 and m=2 to 17.

The compound represented by Formula (13) is a compound in which x+y=15 and m=1 to 18.

The compound represented by Formula (14) is a compound in which p=2 to 20.

Example 1

58.9 parts by weight of bis(4-isocyanatocyclohexyl)methane, 0.64 parts by weight of 2-(3'-t-butyl-2'-hydroxy-5'-methylphenyl)-5-chlorobenzotriazole (Tinuvin 326, manufactured by BASF), 1.5 parts by weight of EVERSORB 109 (manufactured by EVER LIGHT), 0.1 parts by weight of ZelecUN (manufactured by STEPAN), 0.4 parts by weight of a modifier including a total of 99% by weight of the compounds represented by Formulas (9) to (14), 0.0006 parts by weight of Plast Blue 8514 (manufactured by Arimoto Chemical Co., Ltd.), and 0.0003 parts by weight of Plast Red 8320 (manufactured by Arimoto Chemical Co., Ltd.) were placed in a 2000 mL three-necked flask, and completely dissolved in a nitrogen atmosphere at 20° C. Thereafter, a mixed solution of 0.15 parts by weight of dibutyltin dichloride and 41.1 parts by weight of a thiol compound which is a mixture of 5,7-, 4,7-, 4,8-dimercaptomethyl-1,11-dimercapto-3,6,9-trithiaundecane was added thereto and, after transferring the result to a bath of 10° C., stirring and mixing were carried out for 20 minutes, then degassing under a reduced pressure of 0.20 kPa was further carried out for 30 minutes to obtain a polymerizable composition.

In a mold with a cavity for creating lenses having a set center thickness of 10 mm and formed of a 6-curve glass mold (upper mold) having a diameter of 78 mm and a 4-curve glass mold (lower mold) having a diameter of 78 mm, the obtained polymerizable composition was injected into the cavity at a rate of 10 g/sec. The remaining polymerizable composition was stored in a bath with a temperature of 10° C. so as to not generate heat.

The mold into which the polymerizable composition was injected was added into a polymerization oven and gradually heated to 20° C. to 140° C. over 36 hours for polymerization. After completion of the polymerization, the mold was removed from the oven and the molded article was released from the inside of the cavity to obtain a lens.

In addition, the above procedure was repeated 2 hours after the preparation of the polymerizable composition to obtain a lens.

Observation of the presence or absence of striae of each obtained lens confirmed that there were no striae in either the lenses immediately after preparation or after 2 hours. In addition, the lens just after preparation exhibited good properties where the appearance was 0, the refractive index (ne) was 1.602, the Abbe number (ve) was 39, and the Tg was 135° C. The evaluation results are shown in Table-1.

Example 2

24.15 parts by weight of pentamethylene diisocyanate, 1.50 parts by weight of 2-(2'-hydroxy-5'-t-octylphenyl)-benzotriazole (Viosorb 583, manufactured by Kyodo Pharmaceutical Co., Ltd.), 0.12 parts by weight of ZelecUN (manufactured by STEPAN), 0.3 parts by weight of a modifier including 99% by weight of the compounds represented by Formulas (9) to (14), 0.0006 parts by weight of Plast Blue 8514 (manufactured by Arimoto Chemical Co., Ltd.), and 0.0003 parts by weight of Plast Red 8320 (manufactured by Arimoto Chemical Co., Ltd.) were placed in a 2000 mL three-necked flask, and completely dissolved in a nitrogen atmosphere at 20° C. Thereafter, 28.15 g of pentamethylene diisocyanate nurate was added thereto and homogenized, and a mixed solution of 0.03 parts by weight of benzylmethylimidazole, 33.05 parts by weight of a thiol compound which is a mixture of 5,7-, 4,7-, 4,8-dimercaptomethyl-1,11-dimercapto-3,6,9-trithiaundecane, and 14.65 parts by weight of pentaerythritol tetrakis(3-mercaptopropionate) was further added thereto, and, after transferring the result to a bath of 10° C., stirring and mixing were carried out for 20 minutes, then degassing under a reduced pressure of 0.20 kPa was further carried out for 30 minutes to obtain a polymerizable composition.

In a mold with a cavity for creating lenses having a set center thickness of 10 mm and formed of a 6-curve glass mold (upper mold) having a diameter of 78 mm and a 4-curve glass mold (lower mold) having a diameter of 78 mm, the obtained polymerizable composition was injected into the cavity at a rate of 10 g/sec. The remaining polymerizable composition was stored in a bath with a temperature of 10° C. so as to not generate heat.

The mold into which the polymerizable composition was injected was added into a polymerization oven and gradually heated to 20° C. to 130° C. over 36 hours for polymerization. After completion of the polymerization, the mold was removed from the oven and the molded article was released from the inside of the cavity to obtain a lens.

In addition, the above procedure was repeated 2 hours after the preparation of the polymerizable composition to obtain a lens.

Observation of the presence or absence of striae of each obtained lens confirmed that there were no striae in either the lenses immediately after preparation or after 2 hours. In addition, the lens just after preparation exhibited good properties where the appearance was 0, the refractive index (ne) was 1.602, the Abbe number (ve) was 40, and the Tg was 86° C. The evaluation results are shown in Table-1.

Example 3

46.2 parts by weight of isophorone diisocyanate, 0.35 parts by weight of JP-506 H (manufactured by Johoku Chemical Industry Co., Ltd.), 0.5 parts by weight of a modifier including 99% by weight of the compounds represented by Formulas (9) to (14), 0.0006 parts by weight of Plast Blue 8514 (manufactured by Arimoto Chemical Co., Ltd.), and 0.0003 parts by weight of Plast Red 8320 (manufactured by Arimoto Chemical Co., Ltd.) were placed in a 2000 mL three-necked flask, and completely dissolved in a nitrogen atmosphere at 20° C. Thereafter, a mixed solution of 0.075 parts by weight of dimethyltin dichloride, 30.1 parts by weight of a thiol compound which is a mixture of 5,7-, 4,7-, 4,8-dimercaptomethyl-1,11-dimercapto-3,6,9-trithiaundecane, and 23.7 parts by weight of polypropylene glycol (triol type, average molecular weight 1500) was added thereto, and, after transferring the result to a bath of 10° C., stirring and mixing were carried out for 20 minutes, then degassing under a reduced pressure of 0.20 kPa was further carried out for 30 minutes to obtain a polymerizable composition.

In a mold with a cavity for creating lenses having a set center thickness of 10 mm and formed of a 6-curve glass mold (upper mold) having a diameter of 78 mm and a 4-curve glass mold (lower mold) having a diameter of 78 mm, the obtained polymerizable composition was injected into the cavity at a rate of 10 g/sec. The remaining polymerizable composition was stored in a bath with a temperature of 10° C. so as to not generate heat.

The mold into which the polymerizable composition was injected was added into a polymerization oven and gradually heated to 20° C. to 120° C. over 36 hours for polymerization. After completion of the polymerization, the mold was removed from the oven and the molded article was released from the inside of the cavity to obtain a lens.

In addition, the above procedure was repeated 2 hours after the preparation of the polymerizable composition to obtain a lens.

Observation of the presence or absence of striae of each obtained lens confirmed that there were no striae in either the lenses immediately after preparation or after 2 hours. In addition, the lens just after preparation exhibited good properties where the appearance was 0, the refractive index (ne) was 1.562, the Abbe number (ve) was 40, and the Tg was 94° C. The evaluation results are shown in Table-1.

Comparative Example 1

A lens was obtained according to the method of Example 1 except that the modifier described above was not blended therein.

Observation of the presence or absence of striae of each obtained lens confirmed that there were many striae in both the lenses immediately after preparation and after 2 hours.

Comparative Example 2

A lens was obtained according to the method of Example 2 except that the modifier described above was not blended therein.

Observation of the presence or absence of striae of each obtained lens confirmed that there were many striae in both the lenses immediately after preparation and after 2 hours.

Comparative Example 3

A lens was obtained according to the method of Example 3 except that the modifier described above was not blended therein.

Observation of the presence or absence of striae of each obtained lens confirmed that there were many striae in both the lenses immediately after preparation and after 2 hours.

TABLE 1

| | | Example 1 | Example 2 | Example 3 | Comparative Example 1 | Comparative Example 2 | Comparative Example 3 |
|---|---|---|---|---|---|---|---|
| Components (parts by weight) | Isocyanate compound | | | | | | |
| | a | 58.9 | | | 58.9 | | |
| | b | | 24.15 | | | 24.15 | |
| | c | | 28.15 | | | 28.15 | |
| | d | | | 46.2 | | | 46.2 |
| | Thiol compound | | | | | | |
| | e | 41.1 | 33.05 | 30.1 | 41.1 | 33.05 | 30.1 |
| | f | | 14.65 | | | 14.65 | |
| | Polyol compound | | | | | | |
| | g | | | 23.7 | | | 23.7 |
| | Modifier* | 0.4 | 0.3 | 0.5 | 0 | 0 | 0 |
| Evaluation results | Presence/absence of striae (immediately after preparation) | Absent | Absent | Absent | Present | Present | Present |
| | Presence/absence of striae (2 hours after preparation) | Absent | Absent | Absent | Present | Present | Present |
| | Refractive index | 1.602 | 1.602 | 1.562 | 1.602 | 1.602 | 1.562 |
| | Abbe number | 39 | 40 | 40 | 39 | 40 | 40 |
| | Heat resistance (° C.) | 135 | 86 | 94 | 135 | 86 | 94 |

*Modifiers: mixture including the compounds represented by Formulas (9) to (14)

Among the compounds listed in Table-1, compounds other than the modifier described above are as follows.

Isocyanate compound a: bis(4-isocyanatocyclohexyl) methane

Isocyanate compound b: pentamethylene diisocyanate

Isocyanate compound c: pentamethylene diisocyanaturate

Isocyanate compound d: isophorone diisocyanate

Thiol compound e: a mixture of 5,7-, 4,7-, and 4,8-dimercaptomethyl-1,11-dimercapto-3,6,9-trithiaundecane Thiol compound f: pentaerythritol tetrakis(3-mercaptopropionate)

Polyol compound g (component (C)): polypropylene glycol (triol type, average molecular weight 1500)

From Table-1, in each Example, it was possible to effectively suppress striae in comparison with each Comparative Example.

This application claims priority based on Japanese Patent Application No. 2016-067673 filed on Mar. 30, 2016, the disclosure of which is incorporated herein in its entirety.

The invention claimed is:

1. A polymerizable composition for an optical material, comprising:
   component (A);
   component (B); and
   a polymerizable compound,
   (A) an ester compound represented by General Formula (1)

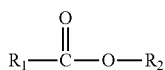  (1)

in General Formula (1), $R_1$ represents a hydrogen atom, a linear alkyl group having 1 to 20 carbon atoms, a branched alkyl group having 3 to 20 carbon atoms, a linear hydrocarbon group having 2 to 20 carbon atoms and having one or more unsaturated bonds, or a branched hydrocarbon group having 3 to 20 carbon atoms and having one or more unsaturated bonds, and $R_2$ represents a polyoxyalkylene group represented by General Formula (2)

—$(CH_2CHR_3O)_nH$  (2)

in General Formula (2), a plurality of present $R_3$ may be the same or different and each $R_3$ represents a hydrogen atom or a methyl group, and n represents an integer of 2 to 20, (B) an ether compound represented by General Formula (3)

$R_4$—O—$R_5$  (3)

(in General Formula (3), $R_4$ represents a linear alkyl group having 1 to 20 carbon atoms, a branched alkyl group having 3 to 20 carbon atoms, a linear hydrocarbon group having 2 to 20 carbon atoms and having one or more unsaturated bonds, or a branched hydrocarbon group having 3 to 20 carbon atoms and having one or more unsaturated bonds, and $R_5$ represents a linear alkyl group having 1 to 20 carbon atoms, a branched alkyl group having 3 to 20 carbon atoms, or a (poly)oxyalkylene group represented by General Formula (4))

—$(CH_2CHR_6O)_mH$  (4)

in General Formula (4), a plurality of present $R_6$ may be the same or different and each $R_6$ represents a hydrogen atom or a methyl group, and m represents an integer of 1 to 20, wherein the polymerizable compound is one or two or more types of compounds selected from the group consisting of a polyiso(thio)cyanate compound, a poly(thio)epoxy compound, a polyoxetanyl compound, a polythietanyl compound, a poly(meth)acryloyl compound, a polyalkene compound, an alkyne compound, a poly(thi)ol compound, a polyamine compound, and an acid anhydride.

2. The polymerizable composition for an optical material according to claim 1, further comprising component (C),
   C) (poly)alkylene glycol represented by General Formula (5)

$HO(CH_2CHR_7O)_pH$  (5)

in General Formula (5), a plurality of present R7 may be the same or different and each R7 represents a hydrogen atom or a methyl group, and p represents an integer of 1 to 20.

3. The polymerizable composition for an optical material according to claim 2, wherein a total weight of components (A), (B) and (C) in the polymerizable composition for an optical material is 0.01 to 7.5% by weight with respect to 100% by weight of the polymerizable composition for an optical material.

4. The polymerizable composition for an optical material according to claim 2, wherein component (C) is included in a range of 0.01 to 1% by weight in 100% by weight of the polymerizable composition for an optical material.

5. A molded article obtainable by curing the polymerizable composition for an optical material according to claim 1.

6. An optical material comprising: the molded article according to claim 5.

7. A plastic lens comprising: the optical material according to claim 6.

8. A method for manufacturing an optical material, comprising cast polymerizing the polymerizable composition for an optical material according to claim 1.

* * * * *